United States Patent [19]

Hirata et al.

[11] Patent Number: 5,404,199
[45] Date of Patent: Apr. 4, 1995

[54] CONTROL APPARATUS OF COPYING MACHINE WITH IMPROVED COMMUNICATION FUNCTION FOR CENTRALIZED CONTROL UNIT

[75] Inventors: Sumiaki Hirata, Aichi; Kazunobu Maekawa, Toyokawa, both of Japan

[73] Assignee: Minolta Camera Kabushiki Kaisha, Osaka, Japan

[21] Appl. No.: 13,185

[22] Filed: Jan. 29, 1993

Related U.S. Application Data

[63] Continuation of Ser. No. 682,009, Apr. 8, 1991, abandoned.

[30] Foreign Application Priority Data

Apr. 10, 1990 [JP] Japan .................... 2-95267

[51] Int. Cl.⁶ .......................................... G03G 21/00
[52] U.S. Cl. .................... 355/204; 355/206; 379/106
[58] Field of Search ........... 355/202, 203, 204, 205, 355/206, 207; 364/184, 185, 186; 371/29.1; 379/106

[56] References Cited

U.S. PATENT DOCUMENTS

| | | | |
|---|---|---|---|
| 3,893,175 | 7/1975 | Solomon | 355/202 X |
| 3,997,873 | 12/1976 | Thornton | 340/149 R |
| 4,162,396 | 7/1979 | Howard et al. | 371/29.1 X |
| 4,167,322 | 9/1979 | Yano et al. | 355/204 X |
| 4,322,813 | 3/1982 | Howard et al. | 364/900 |
| 4,390,953 | 6/1983 | Johnstone | 379/106 X |
| 4,496,237 | 1/1985 | Schron | 355/209 |
| 4,497,037 | 1/1985 | Kato et al. | 364/900 |
| 4,549,044 | 10/1985 | Durham | 179/5 R |
| 4,583,834 | 4/1986 | Seko et al. | 355/206 |
| 4,589,080 | 5/1986 | Abbott et al. | 355/208 X |
| 4,739,366 | 4/1988 | Braswell et al. | 355/208 |
| 4,766,548 | 8/1988 | Cedrone et al. | 379/106 X |
| 4,797,706 | 1/1989 | Sugishima et al. | 355/200 X |
| 4,807,046 | 2/1989 | Nakatani | 358/287 |
| 4,893,248 | 1/1990 | Pitts et al. | 364/464.01 |
| 4,966,703 | 2/1991 | Gray | 379/40 |
| 4,979,132 | 12/1990 | Sugimoto | 364/520 |
| 4,994,926 | 2/1991 | Gordon et al. | 358/400 |
| 5,023,817 | 6/1991 | Au et al. | 371/29.1 X |
| 5,057,866 | 10/1991 | Hill, Jr. et al. | 355/205 X |
| 5,061,916 | 10/1991 | French et al. | 379/100 X |
| 5,077,582 | 12/1991 | Kravette et al. | 355/206 |
| 5,084,875 | 1/1992 | Weinberger et al. | 355/205 X |
| 5,193,111 | 3/1993 | Matty et al. | 379/106 |
| 5,214,772 | 5/1993 | Weinberger et al. | 395/575 |

FOREIGN PATENT DOCUMENTS

| | | |
|---|---|---|
| 59-142559 | 8/1984 | Japan . |
| 60-90460 | 5/1985 | Japan . |
| 63-301667 | 12/1988 | Japan . |

OTHER PUBLICATIONS

Research Newsletter, Dataquest, "Remote Diagnostic—Tool Kit of the Future", 1989, pp. 1–6.

Primary Examiner—A. T. Grimley
Assistant Examiner—Nestor R. Ramirez
Attorney, Agent, or Firm—Burns, Doane, Swecker & Mathis

[57] ABSTRACT

A copying machine control system according to the present invention is a copying machine control system including a control terminal collecting data related to a copying machine, a centralized control unit for receiving the data collected by the control terminal, and a facsimile device provided corresponding to the control terminal. The control terminal includes a first receiving device for receiving data from the copying machine, and a first transmitting device for transmitting the data received by the first receiving device to the centralized control unit. The centralized control unit includes a second receiving device for receiving the data from the first transmitting device of the control terminal, a determination device for determining that the data received by the second receiving device is predetermined data, and a second transmitting device for transmitting predetermined image information to a facsimile device in response to an output of the determining device.

20 Claims, 24 Drawing Sheets

FIG.1
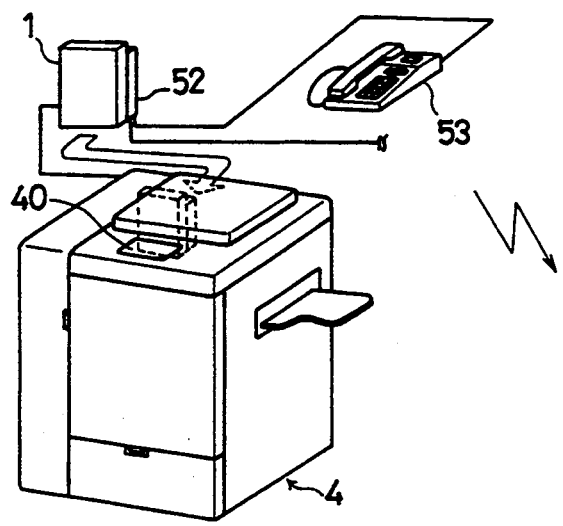
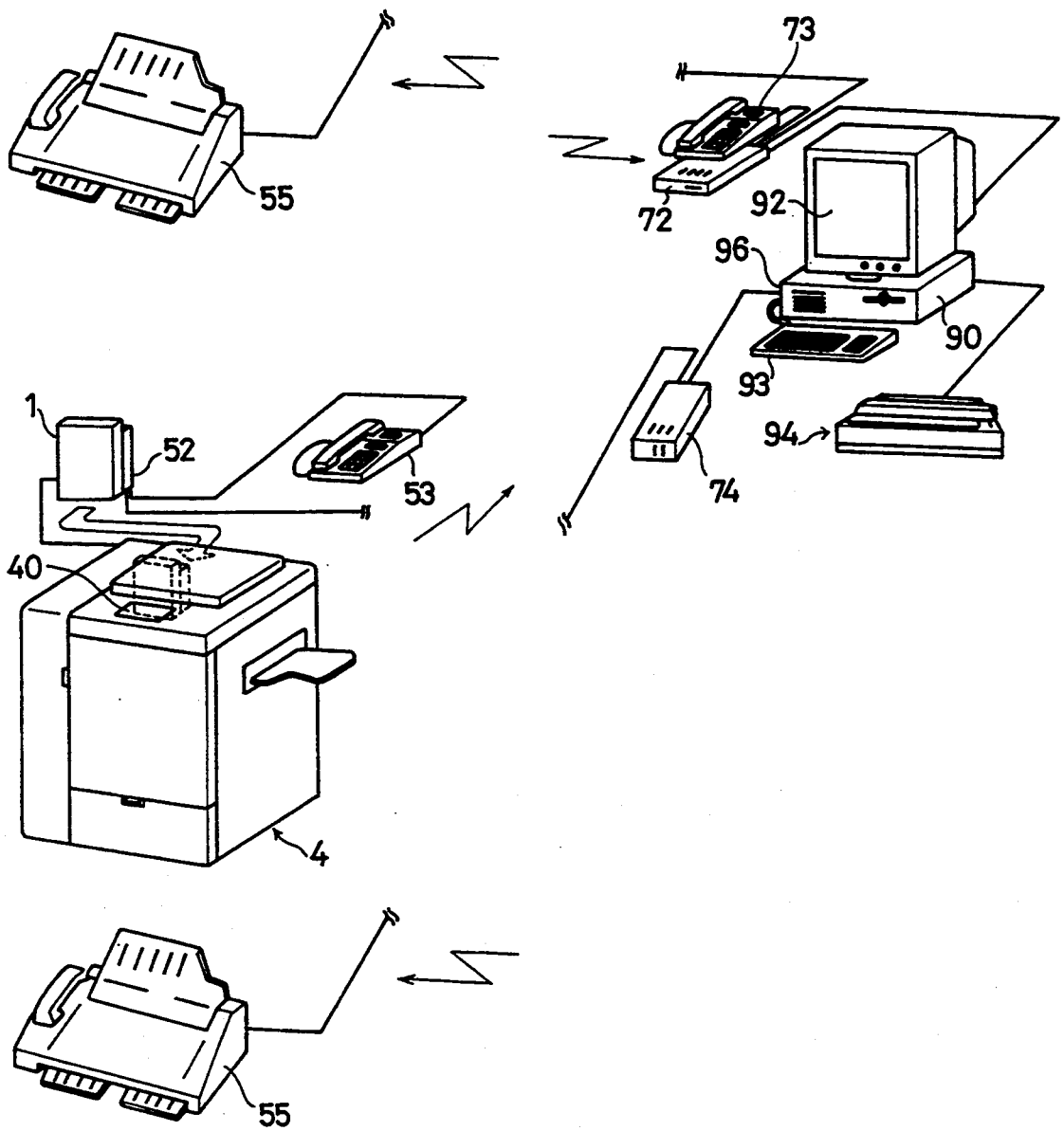

FIG.5

|  |  | b7 | b6 | b5 | b4 | b3 | b2 | b1 | b0 |
|---|---|---|---|---|---|---|---|---|---|
|  | PAPER DISCHARGE | - | - | - | - | - | - | - | 1→0 |
|  | PAPER JAM | 1 | 0 | - | - | - | - | - | - |
| TROUBLE | MAIN MOTOR DEFECT | 1 | 1 | 0 | 0 | 0 | 0 | 1 | - |
| | CHARGER LEAK | 1 | 1 | 0 | 0 | 0 | 1 | 0 | - |
| | NO CHARGER VOLTAGE | 1 | 1 | 0 | 0 | 0 | 1 | 1 | - |
| | ⋮ | ⋮ | ⋮ |  |  |  |  |  | ⋮ |
| | EXPOSURE LAMP BURNED OUT | 1 | 1 | 1 | 1 | 1 | 1 | 1 | - |

TROUBLE : CHARGER LEAK

DATA : ○ ○ ○ ○

[ RECOVERY MEASURES ]
   □ □ □ □ □
   △ △ △ △ △
```
— A

TIMER VALUE 1  ____ msec.
TIMER VALUE 2  ____ msec.
SURFACE
POTENTIAL      ____ volt
      .
         .  .
      .

[ RECOVERY MEASURES ]
   □ □ □ □ □
```
— B

FIG.22

| DTID | USER | COPYING MACHINE MODEL | SERIAL NO. | FAX NO. |
|---|---|---|---|---|
| 00000001 | AAAAAAAA | EP-00001 | 0000000001 | XXX-YYY-ZZZZ |
| 00000002 | BBBBBBBB | EP-00002 | 0000000001 | UUU-VVV-WWWW |
| ... | ... | ... | ... | ... |
| NNNNNNNN | LLLLLLLL | EP-00001 | 0000111111 | PPP-QQQ-RRRR |

CONTROL APPARATUS OF COPYING MACHINE WITH IMPROVED COMMUNICATION FUNCTION FOR CENTRALIZED CONTROL UNIT

This application is a continuation of application Ser. No. 07/682,009, filed Apr. 8, 1991, now abandoned.

BACKGROUND OF THE INVENTION

1. Field of the Invention

The present invention relates to copying machine control apparatus, and to copying machine control apparatus for transmission and the like of data for controlling copying machines to a centralized control unit on the center side.

2. Description of the Related Art

A system for management of a plurality of copying machines is disclosed in U.S. Pat. No. 4,583,834. In the disclosed system, various operating data of the copying machine such as a total number of copies, machine malfunctions and amounts of remaining copy sheets and toner are transmitted to a computer through a communication network. The computer processes the transmitted data and feeds back to the copying machine instructions.

One of objects of a system wherein control data of a plurality, of copying machines are transmitted from respective terminal devices to a control center side through a network such as a public telephone line is to obtain data necessary in maintenance of the copying machines, in other words, data of parameters related to the copying process.

Accordingly, in the above system, parameter data of each copying machine is periodically received and processed, and a decision of necessity of maintenance check, a determination when to perform maintenance, etc. are made on the basis of the data.

When a serviceman makes a visit to a place where a copying machine is provided and takes measures such as the maintenance check or repair, for example, it is difficult to strictly evaluate at the place whether the measures are appropriate or not.

This is because, although it is possible to know whether the operational condition is good or not from experiences by operating a copying machine, it is impossible to numerically evaluate whether parameters of parts subjected to the measures have been appropriately adjusted or not.

SUMMARY OF THE INVENTION

It is an object of the present invention to enhance efficiency of maintenance check in control apparatus communicating with a centralized control unit.

It is another object of the present invention to enhance reliability of maintenance check in control apparatus communicating with the centralized control unit.

It is still another object of the present invention to make it possible to easily confirm the validity of measures such as maintenance check at the locale in control apparatus communicating with the centralized control unit.

In order to achieve the above objects, a control apparatus in accordance with one aspect of the present invention is a control apparatus collecting data about a copying machine and communicating with a centralized control unit on the basis of the collected data, including receiving means for receiving data from the copying machines, input means for inputting a command to transmit the data received by the receiving means to the centralized control unit, and transmitting means for transmitting the data received by the receiving means to the centralized control unit in response to the inputted command.

In the control apparatus configured as described above, the data from copying machines are transmitted to the centralized control unit in response to the inputted command, so that the maintenance check is facilitated.

In order to achieve the above objects, a control apparatus system in accordance with another aspect of the present invention is a copying machine controlling system including a control terminal collecting data about a copying machine, a centralized control unit receiving the data collected by the control terminal, and a facsimile device provided corresponding to the control terminal, wherein the control terminal includes first receiving means for receiving data from the copying machine, and first transmitting means for transmitting the data received by the first receiving means to the centralized control unit, and the centralized control unit includes second receiving means for receiving the data from the first transmitting means of the control terminal, a determination means for determining that the data received by the second receiving means is predetermined data, and second transmitting means for transmitting predetermined image information to the facsimile device in response to an output of the determination means.

In a control apparatus configured as described above, the data transmitted from the control apparatus is determined at the centralized control unit, and predetermined image information are transmitted from the centralized control unit, so that the maintenance check of copying machines can be effectively implemented.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram showing a configuration of a copying machine control system in accordance with the first embodiment of the present invention.

FIG. 5 is a diagram showing a configuration of data transmitted from the copying machine of FIG. 1 to a control unit.

FIG. 20 is a diagram showing one example of image information outputted by a printer in the first embodiment of the present invention.

FIG. 21 is a diagram showing one example of image information facsimile-transmitted in the first embodiment of the present invention.

FIG. 22 is a diagram showing contents of information related to each copying machine stored in the CPU91 in the first embodiment of the present invention.

DESCRIPTION OF THE PREFERRED EMBODIMENTS

Embodiments of the present invention will be described below.

[1] Configuration of System

First, a system configuration including "a copying machine, DT (a data terminal), facsimile apparatus, a network (a public telephone line), a center" will be described.

Figure 2:
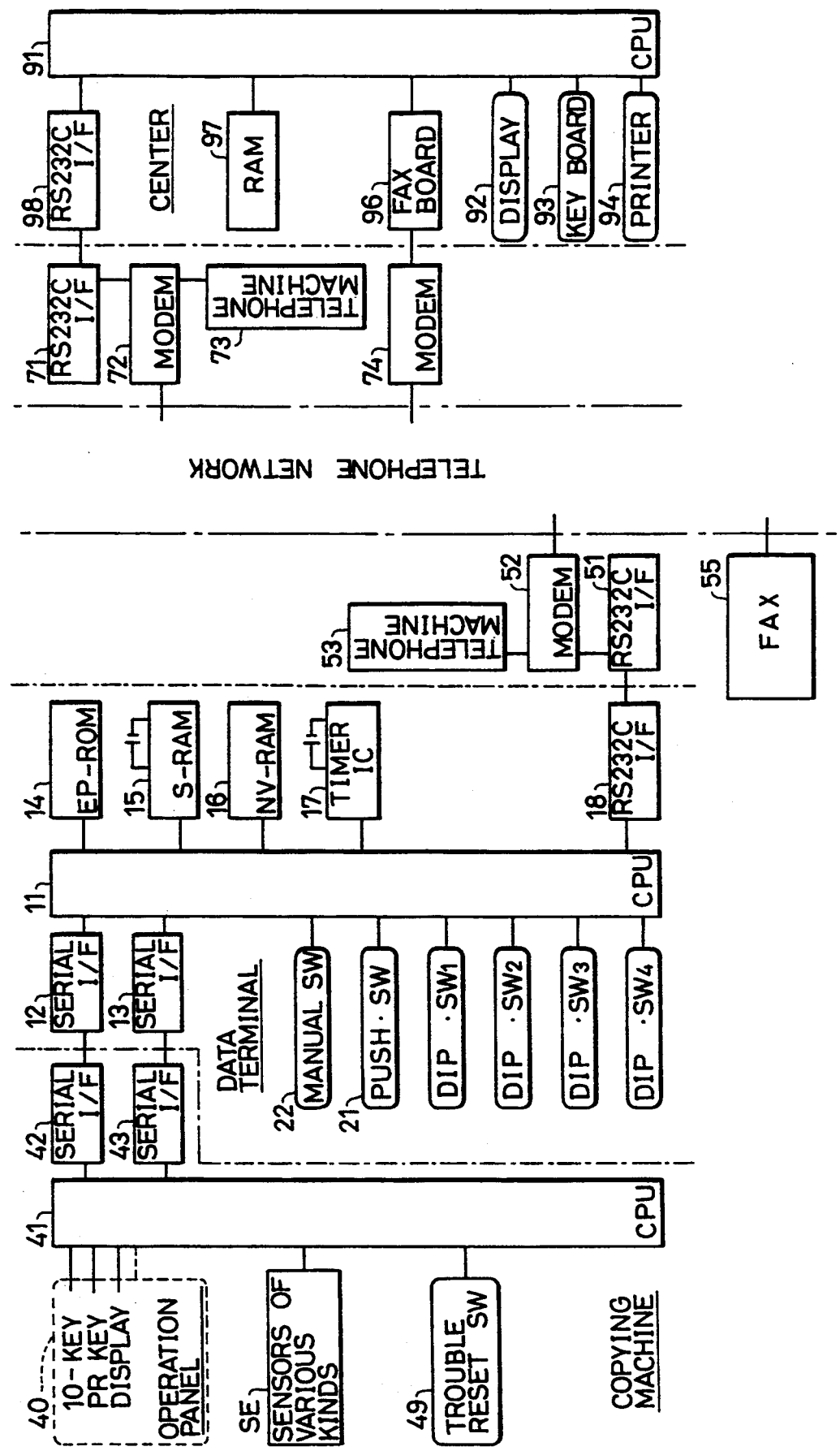
FIG. 2 is a block diagram showing a circuit configuration of the system shown in FIG. 1.

FIG. 1 is a schematic diagram for describing the configuration of the above system, and FIG. 2 is a block diagram of a circuit configuration of the system. In FIG. 2, the relationship between one apparatus on the user side and an apparatus on the center side is shown.

As shown in the figure, the present system includes a plurality of machines on the user side, apparatus on the center side which is a management base, and a network connecting the above.

At each user, a copying machine 4, a DT (Data Terminal) 1, a modem 52 as a communication terminal device, and a telephone machine 53 as a common communication device are provided. Furthermore, at each user, a general facsimile device 55 is provided.

On the other hand, at the center which is a management base, a modem 72 as a communication terminal device, a telephone machine 73 as a common communication device, and a computer 90 (a main body, a display 92, a keyboard 93 and a printer 94) are provided. Furthermore, a facsimile board 96 for giving a facsimile function is provided in computer 90. This facsimile board 96 is connected to the network through modem 74.

Each of DTs 1 is a device for taking in various information of each of copying machines 4, applying predetermined processes to the same, and transmitting the same to computer 90 on the center.

On the other hand, on the center, data for controlling each of the copying machines is produced based on the transmitted data to carry out required processes.

Respective devices at each user and apparatus on the center will be described below.

Copying Machine 4

Copying machine 4 is an apparatus for forming a copied image on paper by original image scanning.

In copying machine 4, various kinds of element data having effects upon the image forming process (a time required for paper transport, a surface potential of a photoreceptor drum, a toner concentration in a developer, an amount of exposure of the photoreceptor drum, a developing bias voltage, an amount of toner sticking on photoreceptor drum, a grid voltage of a corona charger, etc.) are detected by a group of various sensors SE, which are taken in and processed in CPU 41, and then transmitted to CPU 11 of DT 1 through a serial I/F43 and a serial I/F13. The above-described various kinds of element data are expressed in an abstract manner as element data $X_i$ (i=1—the number of items of the element data) in the description of flow charts described later.

In copying machine 4, each of counted values is counted in each counter as a base of an amount of charge asked from the management side (a total counter indicating the number of times of paper discharge and a counter for each paper size indicating the number of sheets used for each paper size), counters as criteria for maintenance (a JAM counter for each portion indicating the number of jams for each portion, a trouble counter for each portion indicating the number of troubles for each portion, and a PM counter for each part indicating the number of times each part is used), and transmitted to CPU 11 of DT 1 through serial I/F42 and serial I/F12. The PM counter is a counter for counting the number of times each part is used, which is a criterion of the time for parts replacement.

Figure 4:
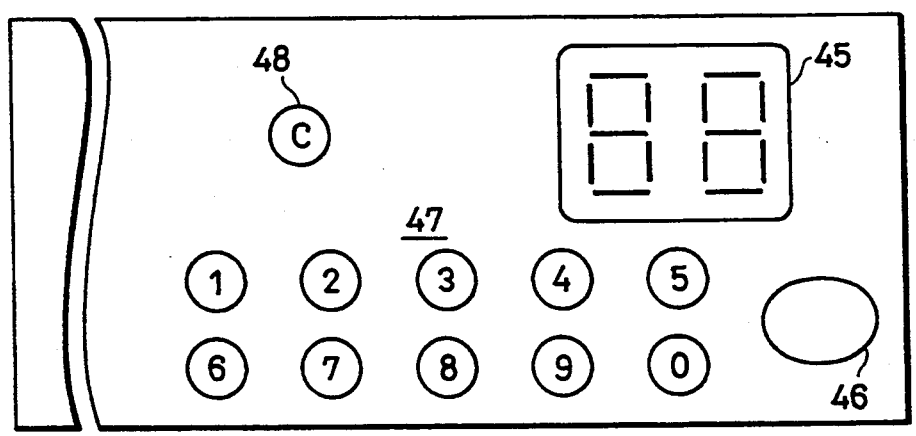
FIG. 4 is a diagram showing contents of an operation panel of the copying machine shown in FIG. 1.

Copying machine 4 performs predetermined operation mode setting and so forth with signals from various kinds of key switches on an operation panel (FIG. 4) (a print (PR) key 46 for commanding copying operation start, a group of ten-key 47 for numerical input, a clear key 48 for commanding input data clear, etc.), various kinds of switches out of the operation panel (a trouble reset switch 49 for corresponding trouble reset, etc.), and also transmits corresponding signals to CPU11 of DT1 as needed through serial I/F42 serial I/F12. The numerical data displayed in display portion 45 is included in the transmitted data.

DT 1

DT 1 is a device for taking in data of copying machine 4 and activating modem 52 under a predetermined condition (a condition in which a transmission flag is set to "1", refer to the description of flow charts about the details) to connect a line to the center side for transmitting data for controlling the copying machine (the above element data, the count data, etc.) to CPU 91 on the center.

A ROM 14 in which a control program is stored, a non-volatile memory 16 for storing number data (described later) and so forth, a system RAM 15 for works backed up by a battery, and a timer IC 17 similarly backed up by a battery are connected to controlling CPU 11 of DT 1.

As described above, CPU 11 takes in the data from copying machine 4 from serial I/F12 or serial I/F13 and performs predetermined processes. CPU 11 also performs predetermined operations, mode setting and the like corresponding to inputs of operation switches. Such processes will be described with respect to the description of flow charts.

FIG. 5 shows configuration of 8-bit data $b_7$–$b_0$ inputted to DT1 through serial I/F12. A paper discharge code indicating discharge of paper is expressed as a trailing edge (change from 1 to 0) of bit $b_0$. A JAM code indicating occurrence of paper jam is expressed as bit $b_7=1$, bit $b_6=0$. A trouble code indicating occurrence of various troubles is expressed as bit $b_7=1$, bit $b_6=1$. Furthermore, a type of a trouble is expressed by bits $b_5$–$b_1$. The 8-bit data is periodically inputted to DT1 and inputted also when a paper jam or some trouble occurs in a copying machine.

Figure 3:
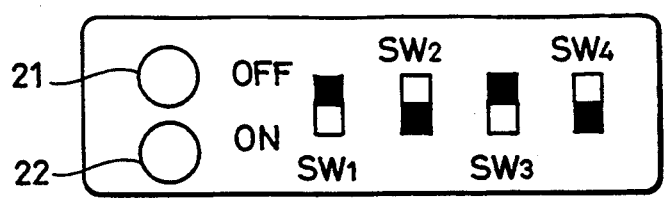
FIG. 3 is a diagram showing contents of operation switches of the control apparatus shown in FIG. 1.

As above-mentioned operation switches, as shown in FIG. 3, four dip switches DIP.SW1–DIP.SW4, a push switch 21 and a manual switch 22 are provided.

DIP.SW4 is a switch for setting an initialization mode. DIP.SW1 is a switch for setting a center selection number (telephone number) input mode, DIP.SW2 for an ID number (DTID) input mode for distinguishing DTs 1, and DIP.SW3 for an ID number (center ID) input mode for distinguishing a center, respectively. Push switch 21 is a switch for commanding initialization transmission (refer to S145 in FIG. 8) and so forth, and manual switch 22 is a switch for commanding manual transmission (refer to FIG. 13).

The CPU 11 is connected to communication I/F (RS232CI/F) 51 of modem 52 through communication I/F (RS232CI/F) 18.

That is, it is configured to be able to communicate with computer 90 at the center by connecting a line with modem 72 on the center side by commanding transmission of an off-hook signal and a center selection signal to modem 52 through these equipments.

The contents of data transmitted from DT 1 to the center side (the data for controlling copying machine 4) are determined according to a type of a transmission flag set to "1" as will be described later.

Facsimile device

Facsimile device 55 is a device for forming image on paper on the basis of image information received from a telephone network. It is obtained by a general user and the configuration and functions thereof are well known, so that the description thereof is omitted.

Center

The center is a computer equipment configured so that it can be connected to a large number of DTs through a telephone network, which is an apparatus for controlling copying machines corresponding to abovementioned a large number of DTs in a centralized manner.

That is, controlling data indicating conditions of a copying machine to which a DT is connected is produced based on data inputted in CPU 91 (the abovementioned element data, count data, etc.) through the communication network, modem 72, a modem side communication I/F (RS232CI/F) 71 and a computer side communication I/F (RS232CI/F) 98 from each DT side.

A bill is printed out on the basis of the controlling data, and determinations as to whether a serviceman should be dispatched or not, as to which parts are to be prepared in the dispatch and the like are made.

Image information is transmitted from CPU91 to facsimile device 55 on the user side through facsimile board 96 and modem 74 when manual transmission data is received from the DT side.

[2] System Control

Next, control of the system will be described.
Processes in Copying Machine

Before describing flow charts, the terms "on edge" and "off edge" are defined.

The "on edge" is defined to mean a condition change in which a state of a switch, a sensor, a signal or the like changes from an off state to an on state.

The "off edge" is defined to mean a condition change in which a state of a switch, a sensor, a signal or the like changes from an on state to an off state.

Figure 6:
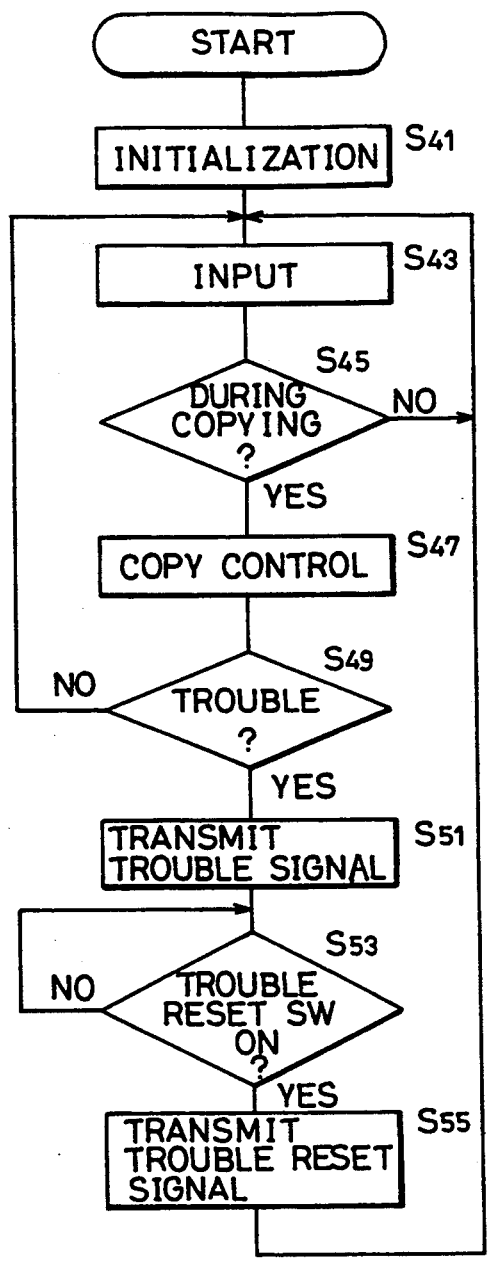
FIG. 6 is a flow chart showing processes performed by a controlling CPU of the copying machine of FIG. 1.

First, the processes in control CPU 41 of a copying machine will be described referring to the flow chart of FIG. 6.

CPU 41, for example, starts processing upon turn-on of a power source, makes initialization such as memory clear, standard mode setting or the like (S41), and subsequently, carries out the processes in steps S43–S49.

Step 43 is an accepting process for input signals from a group of key switches on operation panel 40 (a group of ten keys 47 for numerical input, a print (PR) key for copy start command, a clear key 48 for set number clear command, etc.), a group of switches such as a trouble reset switch 49, and a group of sensors provided in a copying machine. Step S47 is a step collectively indicating processes necessary for copying operation and so forth, which are paper feed control, scanning control, photoreceptor drum control, and developing device control, for example.

When a trouble such as JAM occurs (YES in S49), a signal corresponding to that trouble is transmitted to controlling CPU 11 of the DT (S51). Furthermore, when trouble reset switch 49 is operated by an operator or the like (YES in S53), similarly to the above description, a trouble reset signal is transmitted to controlling CPU 11 of the DT (S55).

Processing in Data Terminal

Processes in controlling CPU 11 of a DT will be described referring to the flow charts shown in FIGS. 7–16.

(a) Main Routine

Figure 7:
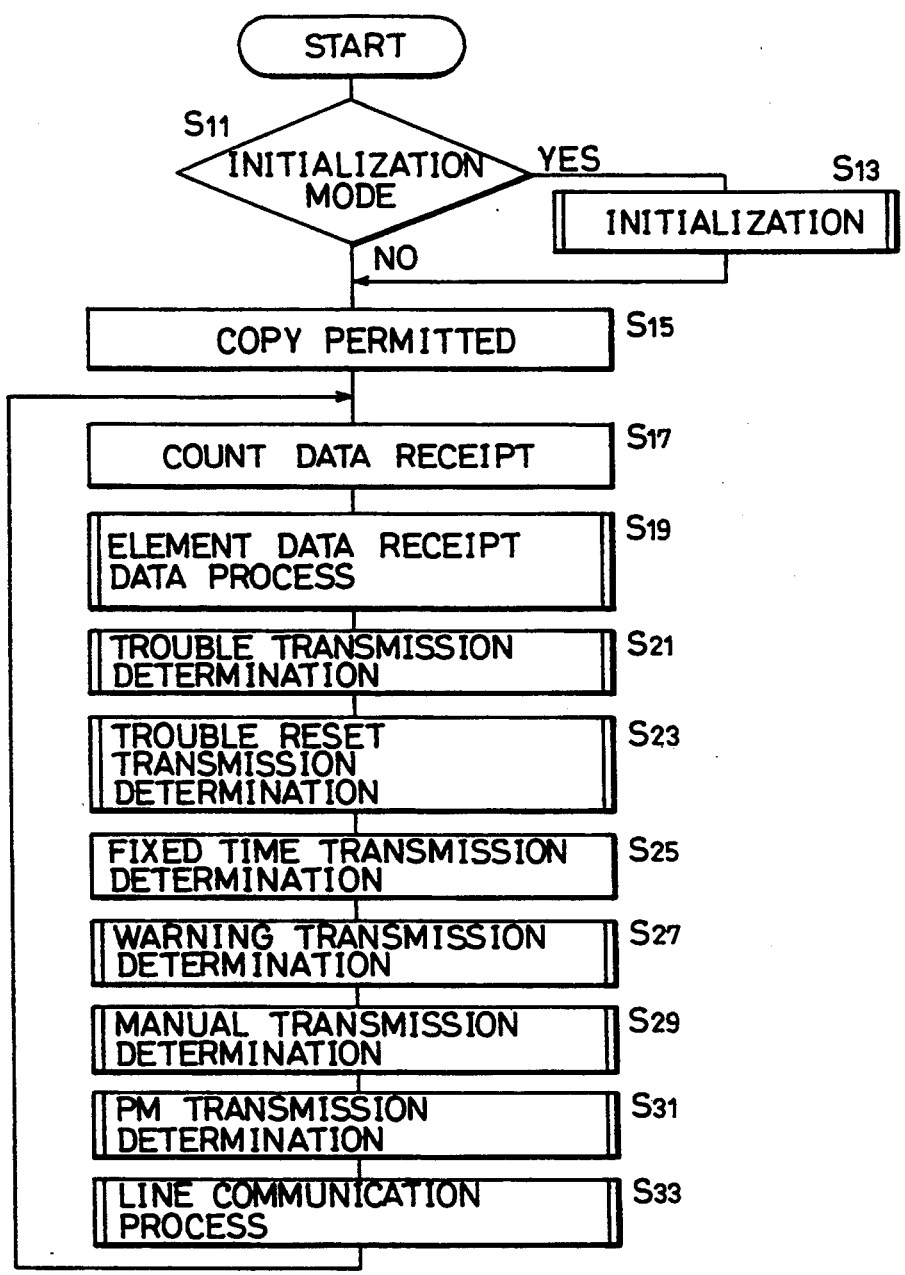
FIG. 7 is a flow chart showing a main routine performed by a controlling CPU of the control apparatus of FIG. 1.

First, the outline of the processes will be described on the basis of the main routine of FIG. 7.

The controlling CPU 11 starts processing upon turn-on of a power source, carries out an initialization process as required (S13), and then transmits a copy permitting signal to controlling CPU 41 of a copying machine (S15). Subsequently, it proceeds to the repeated loop process of steps S17–S33.

Generally, the following processes are carried out in respective sub routine steps.

* Initialization: S13

Upon turn-on of the power source, when dip switch DIP.SW4 is ON, that is, when it is an initialization mode (YES in S11), this routine is executed. Specifically, as will be described in FIGS. 8A and 8B, a selection number (telephone number) of a center, an ID number of DT (DTID), an ID number of the center (center ID) are set and initialization transmission is performed.

* Count Data receipt: S17

A receiving process of various kinds of count data transmitted from controlling CPU 41 of a copying machine is carried out.

The data contents include a discharge code, JAM and trouble codes, data of JAM and trouble counters, a counter for each paper size and a PM counter.

The controlling CPU 11 of a DT updates such data to the newest values and holds the same.

* Element Data Receipt and Data Process: S19

Figure 9A:
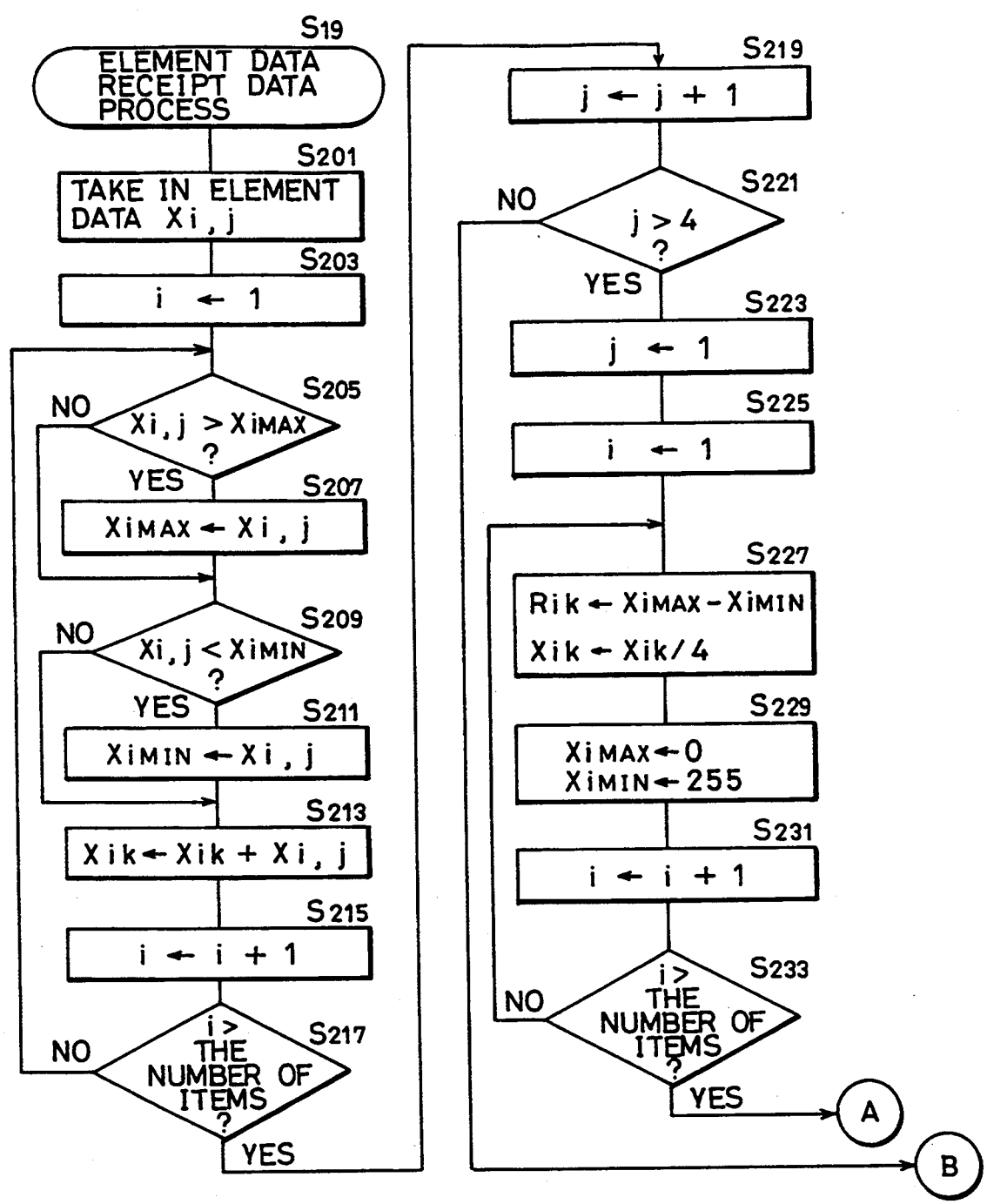
FIGS. 9A and 9B are flow charts showing specific contents of the element data receipt and data process routine of FIG. 7.
Figure 9B:
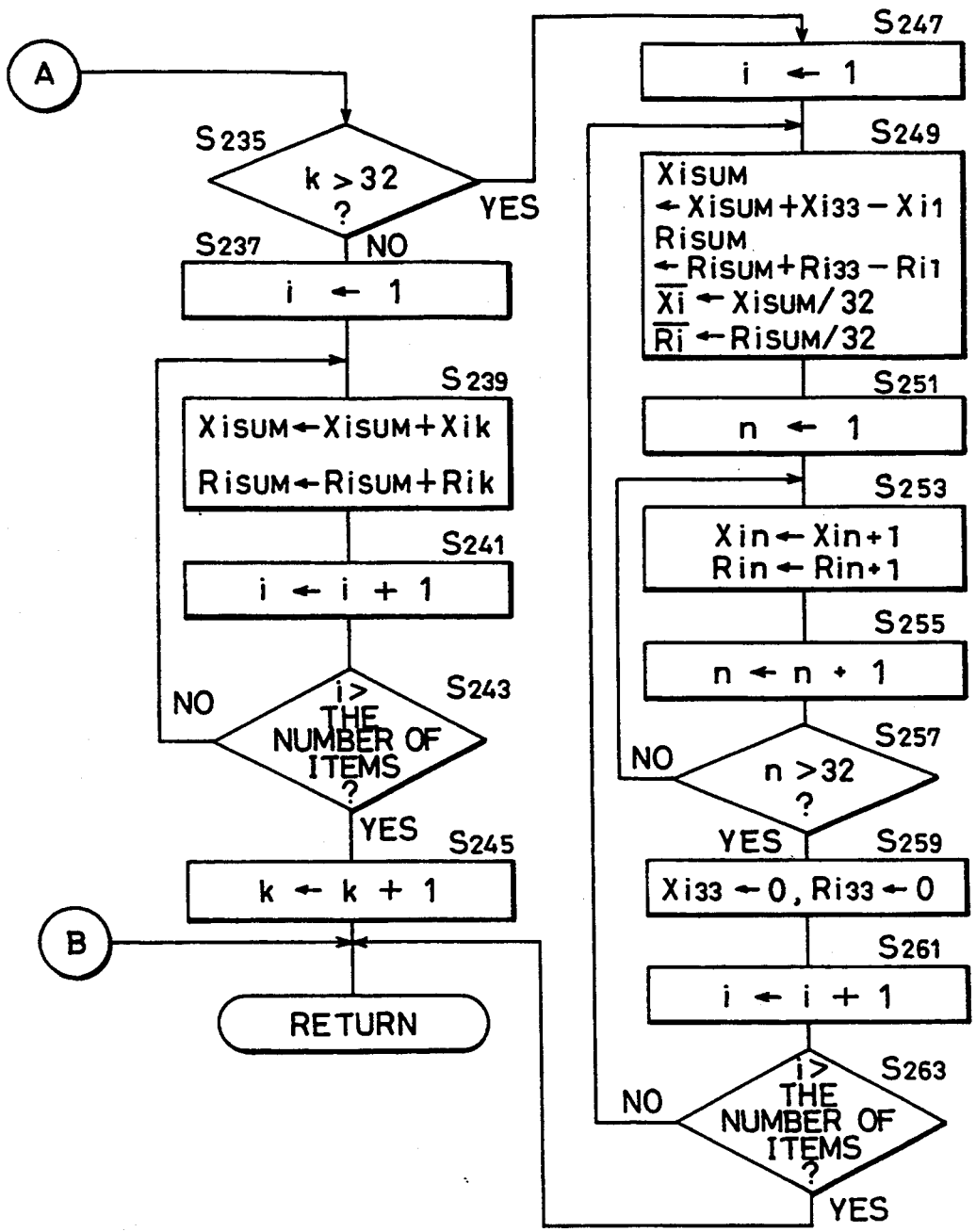

As will be described in FIGS. 9A and 9B, CPU 11 sequentially calculates data corresponding to an average value of each element data and a standard deviation to update them to the newest values.

* Trouble Transmission Determination: S21

As will be described in FIG. 10, a determination is made as to, for example, whether or not the trouble data and trouble recovery data should be transmitted to the center.

* Trouble Reset Transmission Determination: S23

As will be described in FIG. 11, a determination is made as to whether or not the trouble reset data should be transmitted to the center.

* Fixed Time Transmission Determination: S25

A fixed time transmission flag is set to 1 at a predetermined fixed time transmission time and various kinds of count data and various kinds of element data are transmitted to the center.

After completion of transmission by the fixed time transmission, fixed time transmission time data for the next time, current time data and data of the closing date of a bill are transmitted in turn from the center side.

* Warning Transmission Determination: S27

As will be described later in FIGS. 12A and 12B, element data, a counted value of a JAM counter, and a counted value of a PM counter are compared with predetermined threshold values, respectively.

On the basis of the results thereof, a determination is made as to whether or not warning data, warning recovery data should be transmitted to the center.

* Manual Transmission Determination: S29

As will be described later, when manual switch 22 is turned on, a manual transmission flag is set to 1.

By this, various element data are transmitted to the center.

A special manual switch may not be provided, and a manual transmission flag may be set to 1 upon ON of push switch 21 not in the initialization mode, for example.

* PM Transmission Determination: S31

As will be described in FIG. 14, a count value before clearing the PM counter in which a count value is cleared to "0" by parts replacement is transmitted to the center.

* Line Communication Process: S33

As will be described in FIG. 15, when any of the transmission flags is set, line connection with the center is commanded, and after connection, the data communication is implemented.

(b) Sub Routine

Next, details of sub routine steps will be described referring to FIGS. 8 to 16.

Figure 8A:
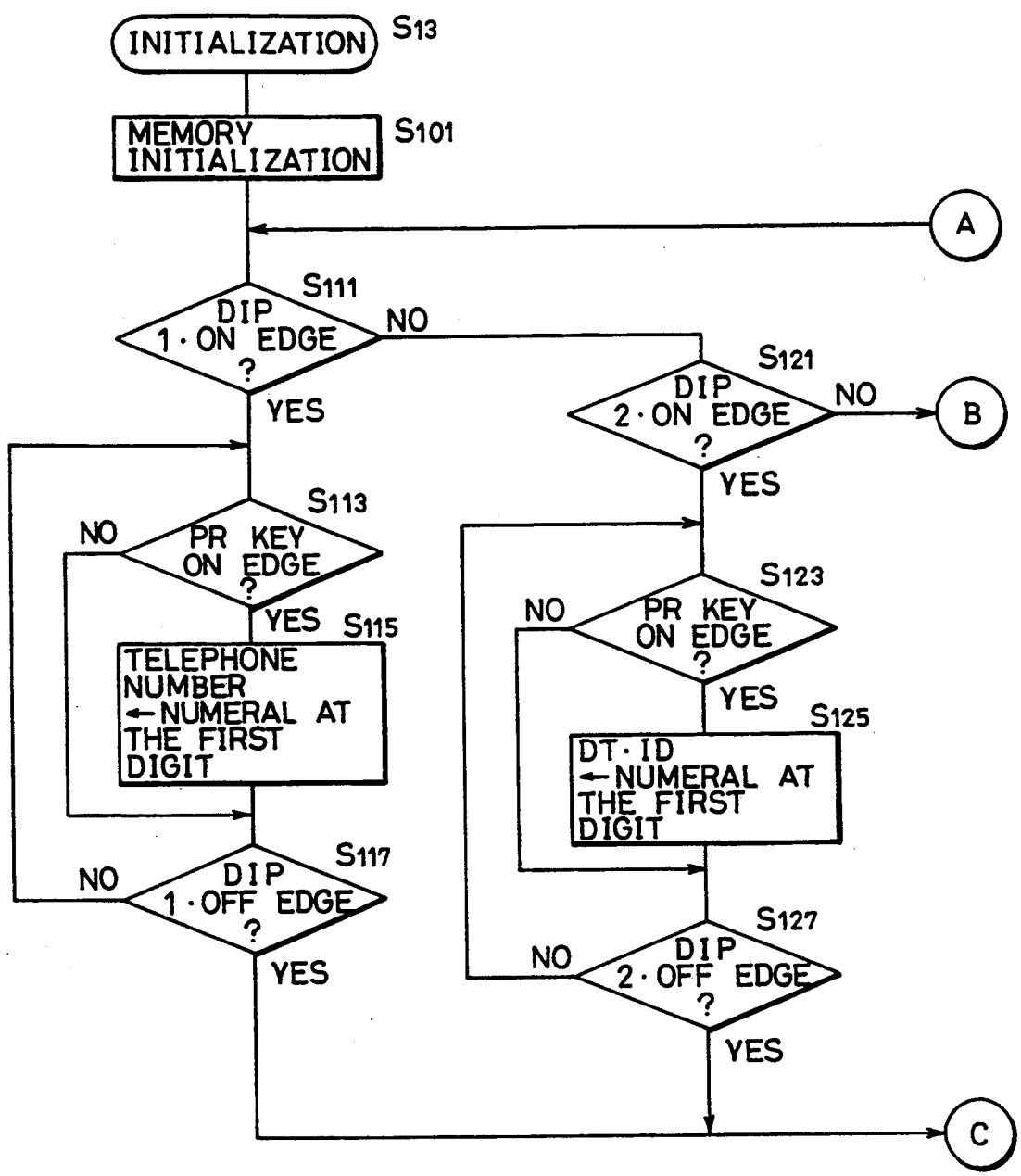
FIGS. 8A and 8B are flow charts showing specific contents of the initialization routine of FIG. 7.
Figure 8B:
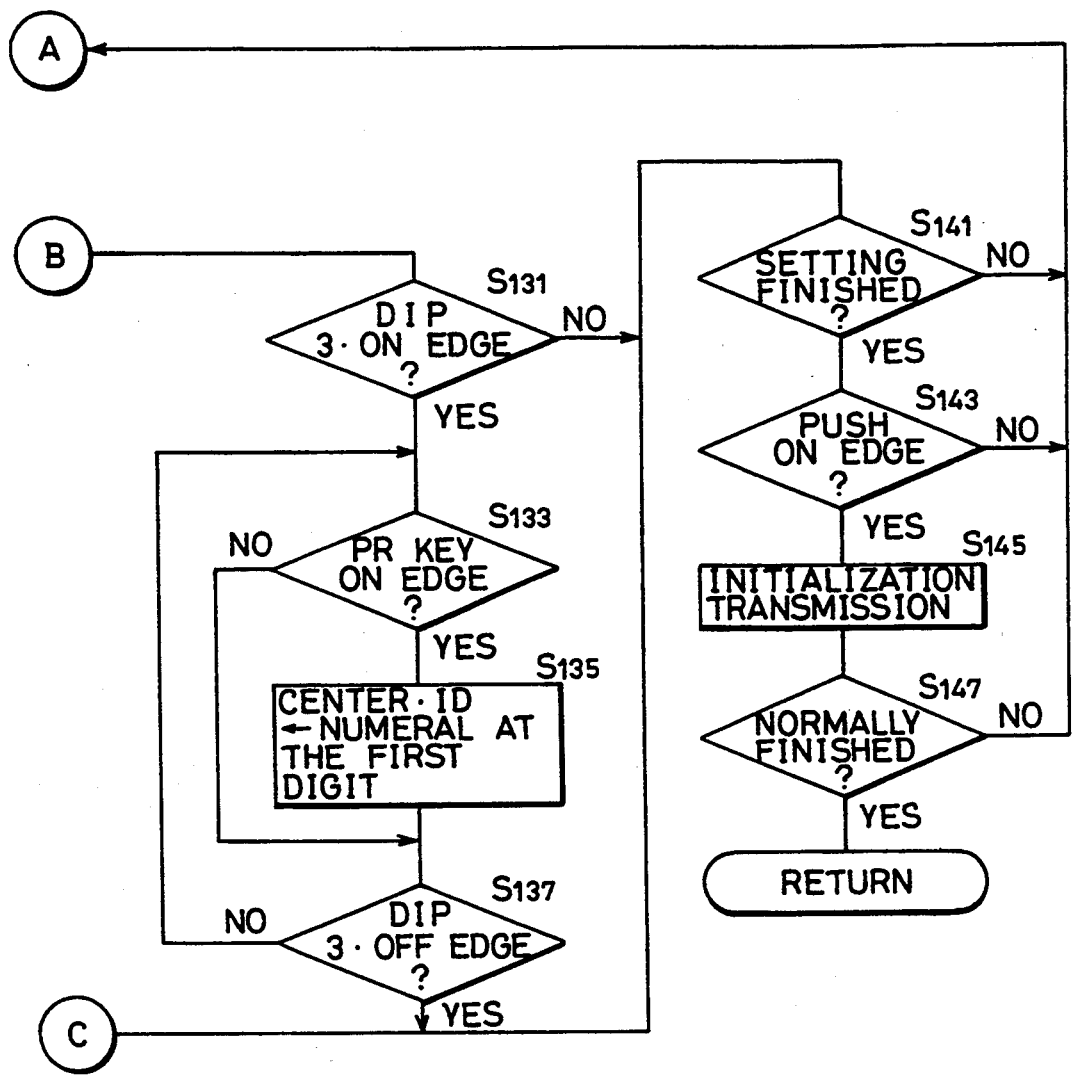

* Initialization Process (FIGS. 8A and 8B)

This process is a process carried out when dip switch DIP.SW4 is on in turn-on of the power source (YES in S11), wherein initialization of a selection number of the center, an ID number of a data terminal (DTID) and an ID number of the center (center ID) are accepted, and then initialization transmission is carried out.

First, memory 15 is initialized (S101), and ON of dip switches DIP.SW1–DIP.SW3 are stood by.

When DIP.SW1 is turned on (YES in S111), an input mode of the selection number (telephone number) is implemented. That is, a figure inputted with ten key 47 of the copying machine and displayed at the first digit of display portion 45 is stored in a nonvolatile memory 16 as selection number data of the center in response to input of print key 46 (YES in S113). The selection number input mode is released with OFF of DIP.SW1 (S117).

Similarly, in response to ON of DIP.SW2 (YES in S121), an input mode of DTID is set, and a figure displayed at the first digit of display portion 45 is stored in nonvolatile memory 16 (S125) as DTID data in response to input of print key 46 (YES in S123). The DTID input mode is released with OFF of DIP.SW2 (S127).

Similarly, in response to ON of DIP.SW3 (YES in S131), an input mode of the center ID is set and a figure displayed at the first digit of display portion 45 is stored in nonvolatile memory 16 as the center ID data (S135) for every input of print key 46 (YES in S133). The center ID input mode is released with OFF of DIP.SW3 (S137).

In this way, when three kinds of data setting have been finished all (YES in S141), push switch 21 is made valid, and upon ON of the push switch 21 (YES in S143), initialization transmission is made to the center (S145).

That is, CPU 11 calls the center through the communication network to transmit the above two kinds of ID data to CPU 91 of the center. When the transmission is finished, CPU 11 receives the data transmitted from CPU 91 of the center (the closing date of the count data, the next fixed time transmission time, the current time, and a threshold value of a warning determination).

When the above transmission and receipt are finished, a determination is made as to whether the communication has been normally made or not (S147).

As a result, when the communication has not been normally performed (NO in S147), it returns to step S111 and another ON of DIP.SW1 is stood by.

On the other hand, when the communication has been made normally (YES in S147), it returns to the main routine and the processes after step S15 are carried out.

* Element Data Receipt, etc. (FIGS. 9A and 9B)

In this sub routine process, data for comparison with a threshold value (refer to the warning transmission determination routine of FIGS. 12A and 12B) is calculated on the basis of the element data transmitted from a copying machine.

First, a group of element data $X_{i,j}$ transmitted from a copying machine for every discharge of copy paper are taken in from serial I/F13 (S201). Here, the subscript i expresses an item number of the element data and the subscript j expresses the order in each item.

Next, after substituting an initial value 1 for the item number i (S203), CPU 11 sequentially updates the maximum value $X_{iMAX}$, the minimum value $X_{iMIN}$ and a sum $X_{ik}$ for each item (S205–S217).

Subsequently, the subscript j is incremented (S219), and the flow returns to the main routine.

In this way, when the processes of steps S201–S217 are carried out four times for each item (S221; YES), the subscript j is reset to 1 (S223), an initial value 1 is substituted into the item number i (S225), and the difference $R_{ik}$ between the maximum value and the minimum value and an average value $X_{ik}$ of four pieces of data are respectively calculated for each item (S227–S233). In step S229, initial values of the maximum value $X_{iMAX}$ and the minimum value $X_{iMIN}$ are given for preparation of processes in the next steps S205–S211.

After the processes of the above S227–S233, the processes of steps S237–S245, or of steps S247–S263 are carried out.

Steps S237–S245 are processes for a case in which the total of the processes of above S227–S233 does not reach thirty three times, wherein a sum $R_{iSUM}$ of the difference $R_{ik}$ between the above-mentioned maximum value and the minimum value and a sum $X_{iSUM}$ of the average value $X_{ik}$ of the above-mentioned four pieces of data are calculated for the data for thirty two times for each item.

Steps S247–S263 are processes for the case in which the total of processes in the above S227–S233 is thirty three times or more, wherein a sum $R_{iSUM}$ of the above difference $R_{ik}$ and a sum $X_{iSUM}$ of the above average value $X_{ik}$ are calculated for the newest data for thirty two times for each item, and also calculating average values $\overline{X}_i$ and $\overline{R}_i$, respectively.

As described above, an average value $\overline{X}_i$ of the newest 128 ($=4\times32$) pieces of data and an average value of deviations (a value corresponding to the standard deviation) $\overline{R}_i$ are obtained for each item of the element data.

Figure 10:
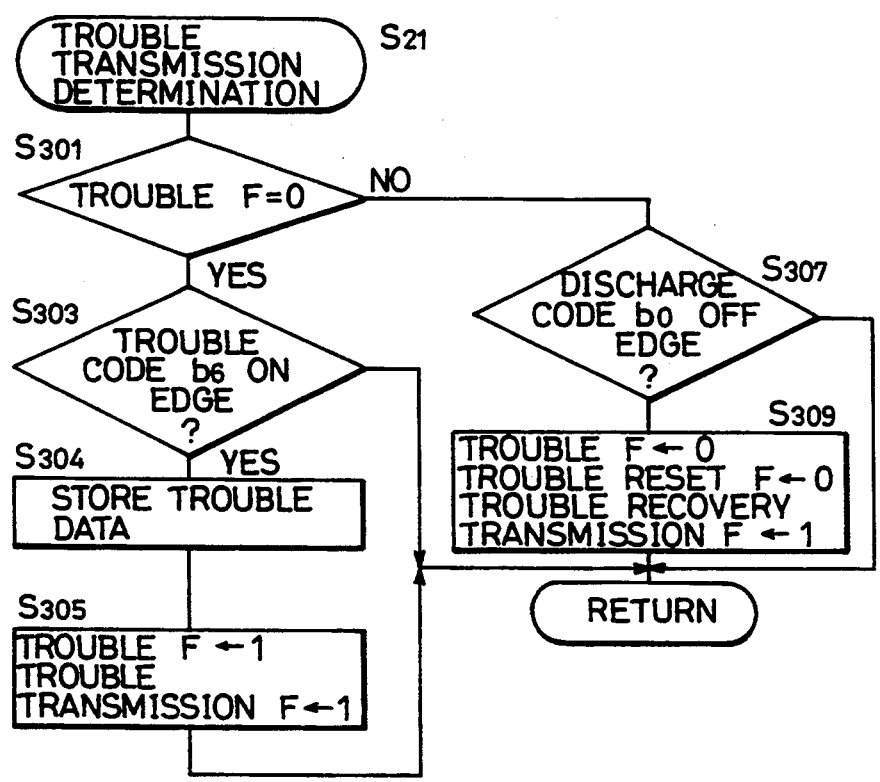
FIG. 10 is a flow chart showing specific contents of the trouble transmission determination routine of FIG. 7.

* Trouble Transmission Determination (FIG. 10)

The process is a sub routine for controlling trouble transmission and trouble recovery transmission.

That is, when "trouble flag=0" (YES in S301), if a trouble code is detected from a copying machine (YES in S303), the 8-bit data $b_7$–$b_0$ are stored in a predetermined area of RAM 15 (S304), and the trouble flag and a trouble transmission flag are set to "1", respectively (S305).

In a condition of "trouble flag=1" (NO in S301), when a paper discharge code from a copying machine is detected (YES in S307), the trouble flag and a trouble reset flag (refer to FIG. 11) are reset to "0", respectively, and a trouble recovery transmission flag is set to "1" (S309). This is because the paper discharge in a copying machine is an operation to be performed after a trouble is recovered.

Upon setting of the trouble transmission flag and the trouble recovery transmission flag, a line communication process (FIG. 15) is carried out and trouble data and trouble recovery data are transmitted to the center, respectively.

Figure 11:
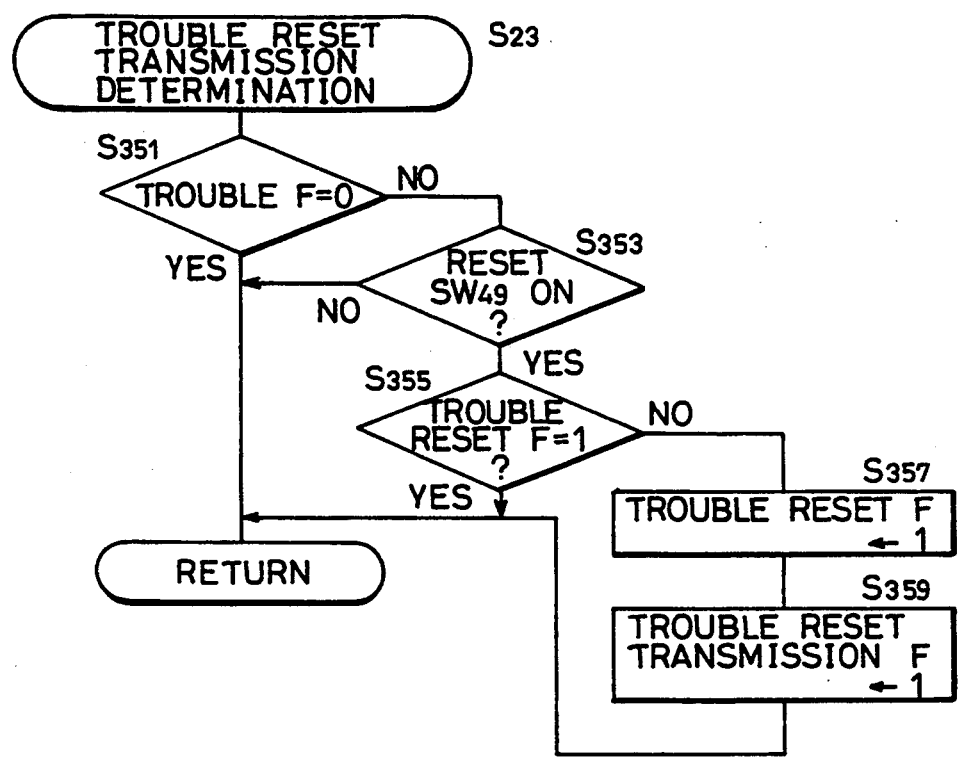
FIG. 11 is a flow chart showing specific contents of the trouble reset transmission determination routine of FIG. 7.

* Trouble Reset Transmission Determination (FIG. 11)

The process is a sub routine for controlling trouble reset transmission.

That is, in a condition of "trouble flag=1" (NO in S351), when trouble reset switch 49 is turned on (YES in S353), on the condition that a trouble code is not detected again (NO in S355), the trouble reset flag and a trouble reset transmission flag are set to "1", respectively (S357, S359).

When a trouble reset transmission flag is set to "1", the line communication process (FIG. 15) is carried out, and the trouble reset data is transmitted to the center. By this, on the center side, it is recognized that a measure for the trouble has been taken (a measure by a user or the like).

Figure 12A:
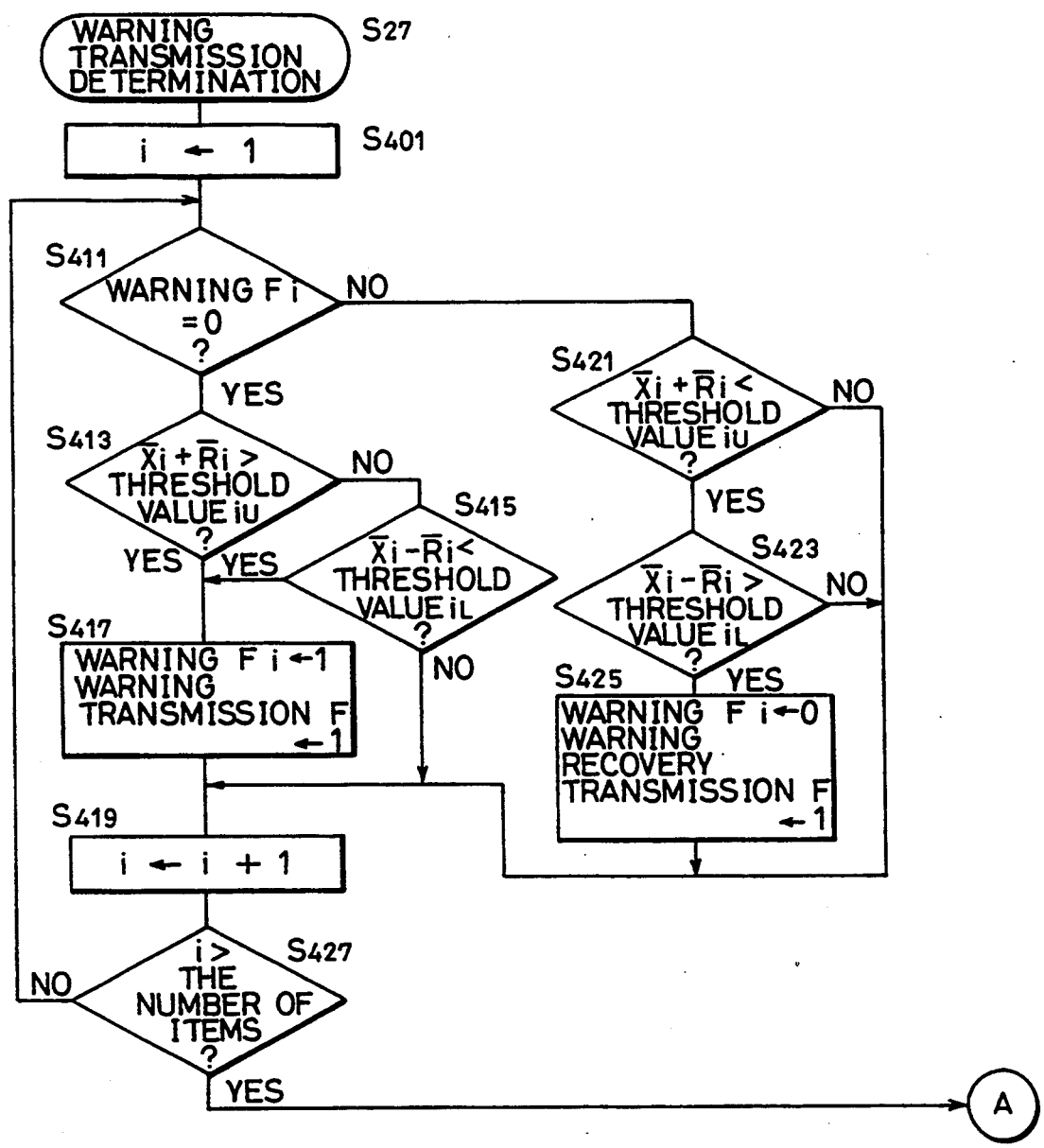
FIGS. 12A and 12B are flow charts showing specific contents of the warning transmission determination routine of FIG. 7.
Figure 12:
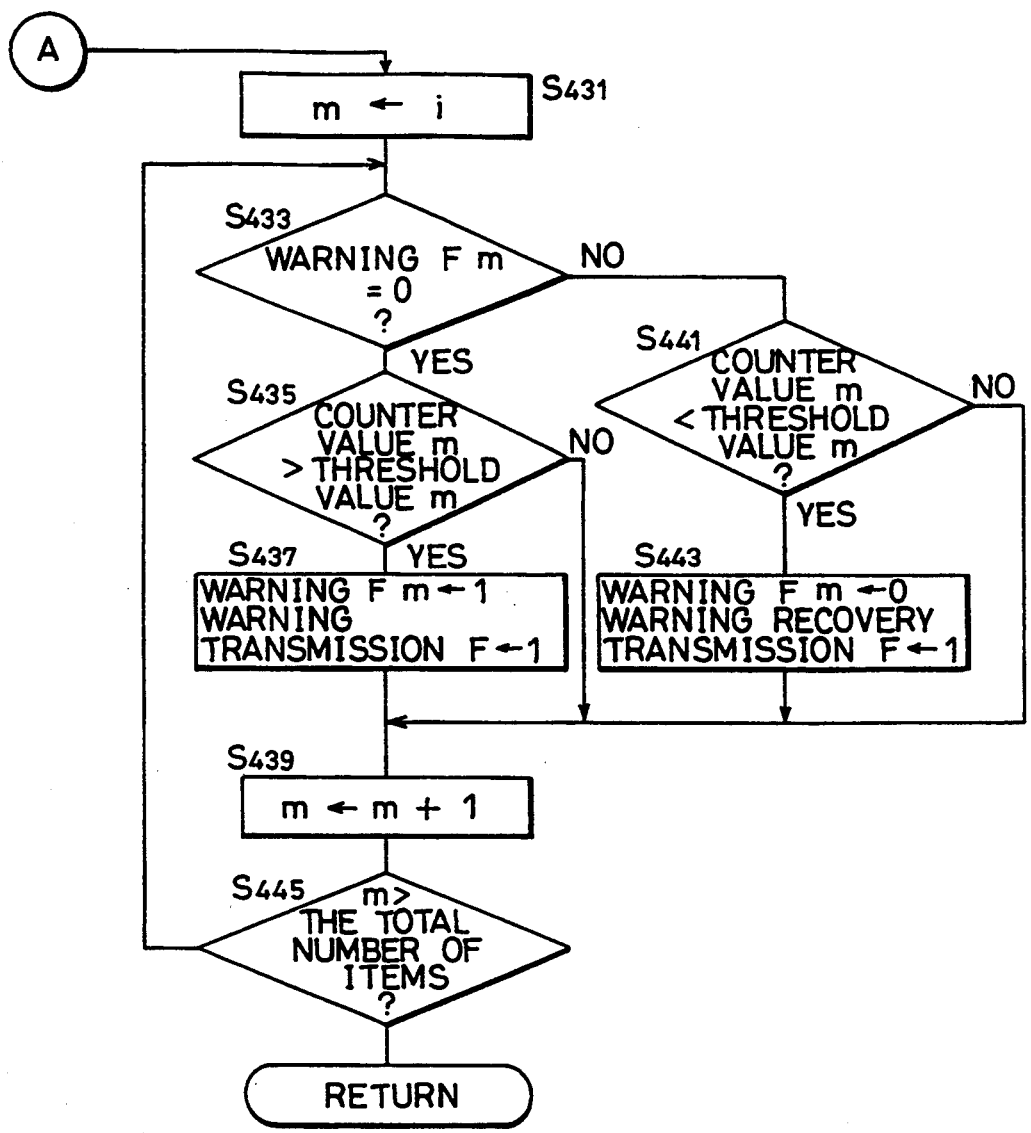

* Warning Transmission Determination (FIGS. 12A and 12B)

In this routine, the warning transmission and so forth are controlled.

Steps S401 through S427 are processes for making warning transmission when a value of element data gets out of a peculiar permittable range, and warning recovery transmission when it recovers into the permittable range, respectively.

First, an initial value "1" is set in the item number i indicating a type of the element data (S401).

Next, in step S411, a warning flag about objective element data (in the first time, the first element data) is examined.

As the result, when the warning flag about the particular element data is "0" (YES in S411), a determination is made as to whether or not the element data value is in the permittable range peculiar to the element data, in other words, whether or not it is in the range not more than an upper limit threshold value $_{iU}$ and not less than a lower limit threshold value $_{iL}$. When it is out of the permittable range (YES in S413 or YES in S415), a warning flag $F_i$ about the particular element data and a warning transmission flag are set to "1", respectively (S417). By this, the line communication process (FIG. 15) is carried out and warning data is transmitted to the center.

On the other hand, when a warning flag of the objective element data is "1" (NO in S411), a determination is made as to whether the value of the element data has recovered into the above-mentioned permittable range or not. If it has recovered (YES in S421 and YES in S423), a warning flag $F_i$ about the particular element data is reset to "0", and the warning recovery transmission flag is set to "1". By this, the line communication process (FIG. 15) is carried out, and warning recovery data is transmitted to the center.

After performing such processes until i attains the number of items of the element data, in other words, after performing processes with respect to all the element data, the flow proceeds to the processes after step S431.

Steps S431–S445 are processes for making warning transmission when count values (frequency) of the JAM counter and the PM counter exceed peculiar threshold values, and warning recovery transmission when they recover below the threshold values, respectively.

First, an initial value "i (the last number of the element data +1)" is set in the item number m indicating types of a JAM counter and a PM counter (S431).

Next, in step S433, a warning flag about the objective JAM counter or PM counter is examined.

As a result, when the warning flag about the particular JAM counter or PM counter is "0" (YES in S433), a determination is made as to whether or not the value of the counter is in a permittable range peculiar to the counter, or whether it exceeds the threshold value $_m$ or not. When it exceeds the same (YES in S435), the warning flag $F_m$ and the warning transmission flag about the particular counter are set to "1", respectively (S437). By this, the line communication process (FIG. 15) is carried out and warning data is transmitted to the center.

On the other hand, when a warning flag about the objective JAM counter or PM counter is "1" in the above-mentioned S433 (NO in S433), a determination is made as to whether the value of the particular counter has been recovered below the above threshold value or not. In the case of recovery (YES in S441), the warning flag $F_m$ about the particular counter is reset to "0", and the warning recovery transmission flag is set to "1". By this, the line communication process (FIG. 15) is carried out and the warning recovery data are transmitted to the center.

CPU 11 performs such processes until m attains the total number of items of element data and counters, in other words, after performing with respect to all the counters, it returns to the main routine.

As described above, the warning transmission and the warning recovery transmission are controlled.

Figure 13:
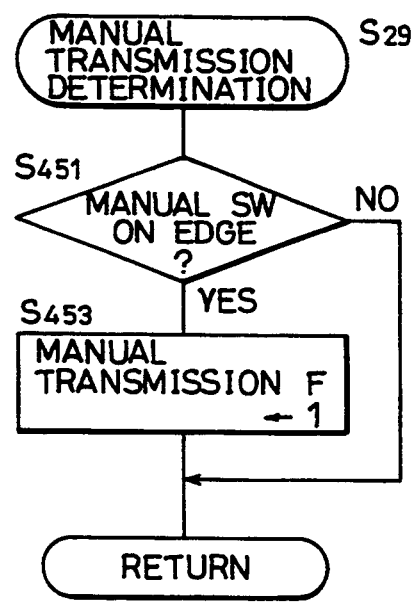
FIG. 13 is a flow chart showing specific contents of the manual transmission determination routine of FIG. 7.

* Manual Transmission Determination (FIG. 13)

When an on edge of manual switch 22 is detected (YES in S451), a manual transmission flag is set to "1" (S453). By this, the line communication process (FIG. 15) is implemented, and element data is transmitted to the center as will be described later.

Figure 14:
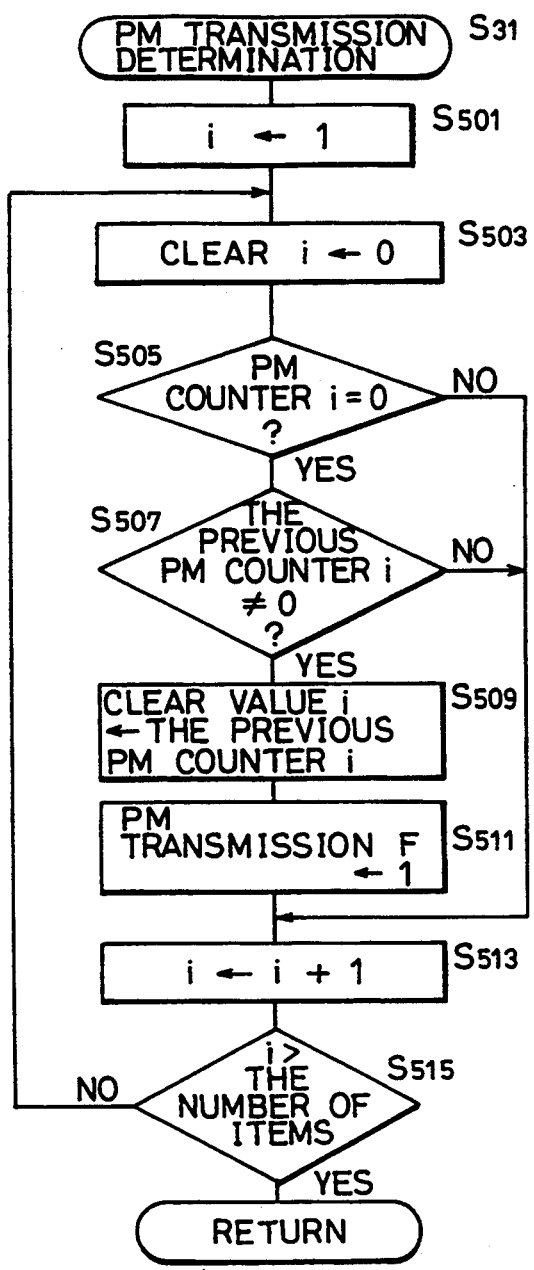
FIG. 14 is a flow chart showing specific contents of the PM transmission determination routine of FIG. 7.

* PM Transmission Determination (FIG. 14)

In this routine, the PM transmission is controlled.

First, an item number i indicating a type of a PM counter is set to an initial value "1" (S501), and after the processes in steps S503–S511 are carried out, the value of i is incremented, that is, changing a type of PM counter, the above processes are repeated.

Here, the processes in the above S503–S511 are processes for retaining a count value immediately before clearing the PM counter (S509) and setting the PM transmission flag to "1" (S511) when the PM counter is cleared (YES in S505 and YES in S507). A PM counter is cleared by a serviceman when replacing parts corresponding to the PM counter.

When "PM transmission flag=1", the line communication process (FIG. 15) is carried out, and the PM data (types of replaced parts, a count value immediately before the replacement) are transmitted to the center.

Figure 15:
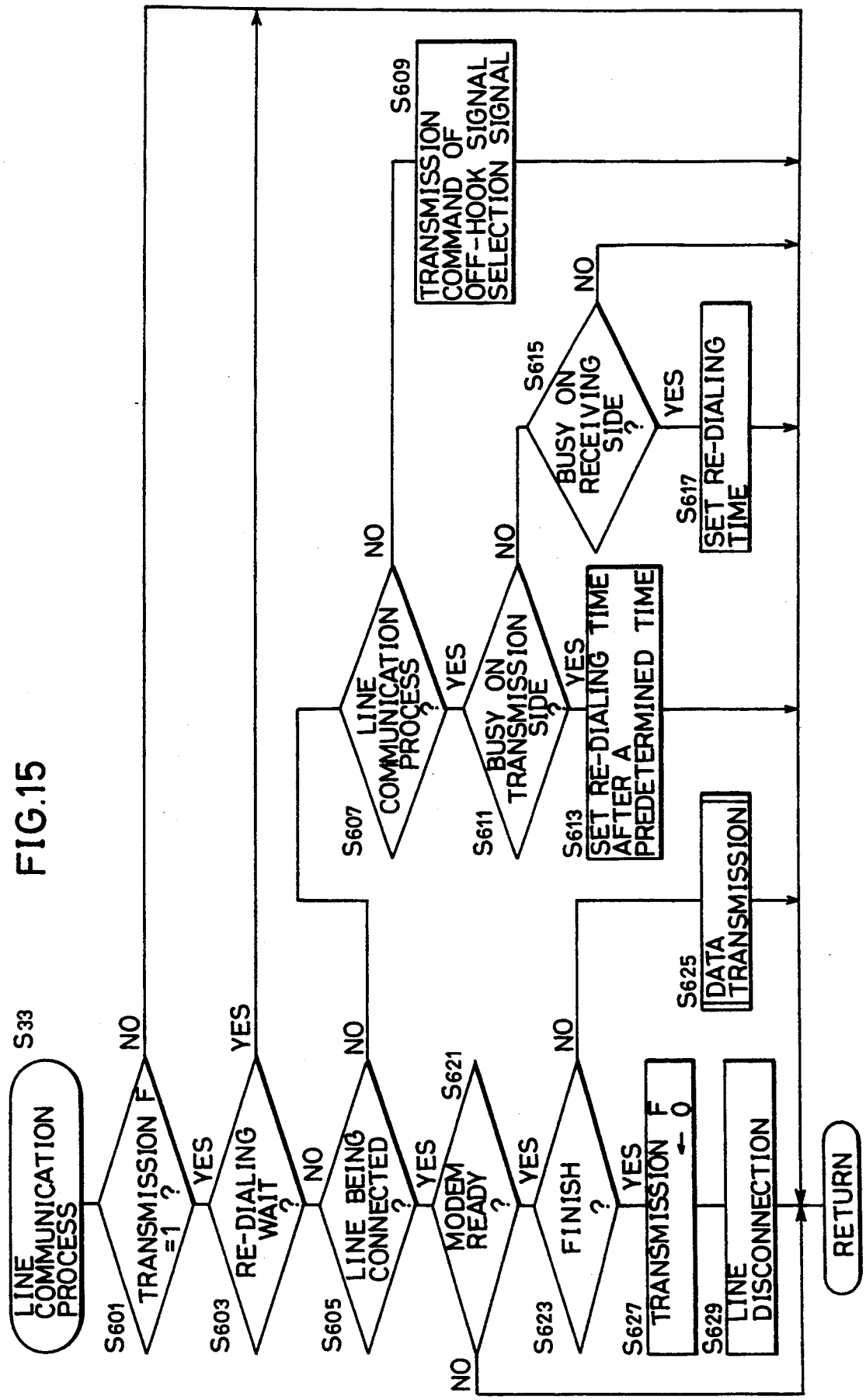
FIG. 15 is a flow chart showing specific contents of the line communication process routine of FIG. 7.

* Line Communication Process (FIG. 15)

In this routine, the center is called in response to "any of transmission flags=1", and data corresponding to the particular transmission flag is transmitted.

That is, when any of transmission flags is set to "1" (YES in S601), on conditions that it is not in a re-dial standby (NO in S603), the network with the center is not connected (NO in S605), and it is not in a standby state after transmission command of an off-hook signal and a selection signal (NO in S607), transmission of an off-hook signal and a selection signal is commanded to modem 52 (S609).

As the result of the process in the S609, when the telephone machine 53 is "line is busy", and an off-hook signal and a selection signal can not be transmitted accordingly (YES in S611), in order to perform the above-mentioned S609 process again after a predetermined time period, a re-dial time (a time after the above predetermined time period) is set (S613). By this, until the above-mentioned redial time, the determination in the S603 is "YES", and the process of the S609 is not carried out, accordingly. At the redial time, with NO in S603 NO in S605 NO in S607 S609, modem 52 is commanded to transmit an off-hook signal and a selection signal again.

When a determination is made that the center side modem 72 is "busy" (including the case where there is no response from CPU91 even if connection with modem 72 is made)" as a result of transmission of a selection signal from modem 52 to the telephone network in response to the process in the S609 (YES in S615), similarly to the above description, a re-dialing time is set (S617), and the process in the S609 is carried out again after a predetermined time period.

On the other hand, when the line is connected to the center side modem 72 (YES in S605) as am result of transmission of a selection signal from modem 52 to the telephone network in response to the process of the S609, after standing by the ready of modem 52 (YES in S621), the data transmission process (refer to S625 in FIG. 16) is performed and data defined by a transmission flag set to "1" is transmitted to the center. The data transmission process will be described later.

In this way, when all the data are transmitted (YES in S623), the transmission flag is reset to "0" (S627), an off-hook signal is transmitted to the network to disconnect the line with the center side telephone machine 73 (S629).

As described above, the line connection process is performed, data is transmitted to the center and data is transmitted from the center as required.

Figure 16:
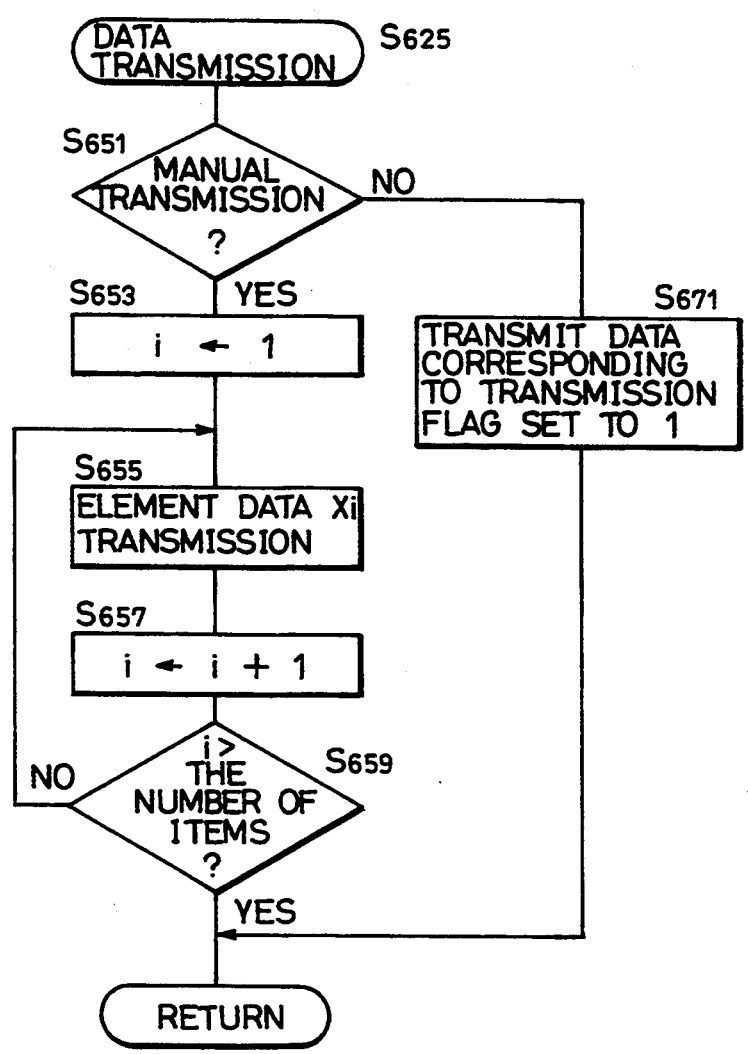
FIG. 16 is a flow chart showing specific contents of the data transmission routine of FIG. 15.

* Data Transmission (FIG. 16)

First, with "manual transmission flag=1", a determination is made as to whether the present dialing (center calling) has been performed or not (S651).

As a result, if it is "YES", all the element data are transmitted sequentially (that is, in the order of item number) to the center (S655–S659).

On the other hand, when the present dialing is caused by the fact that a transmission flag other than the manual transmission flag is set to "1" (NO in S651), data corresponding to the transmission flag which is set to "1" is transmitted to the center side (S671).

[Processing in the Center]

Next, the processing in a CPU 91 provided in computer 90 in the center will be described referring to FIGS. 17–19.

Figure 17:
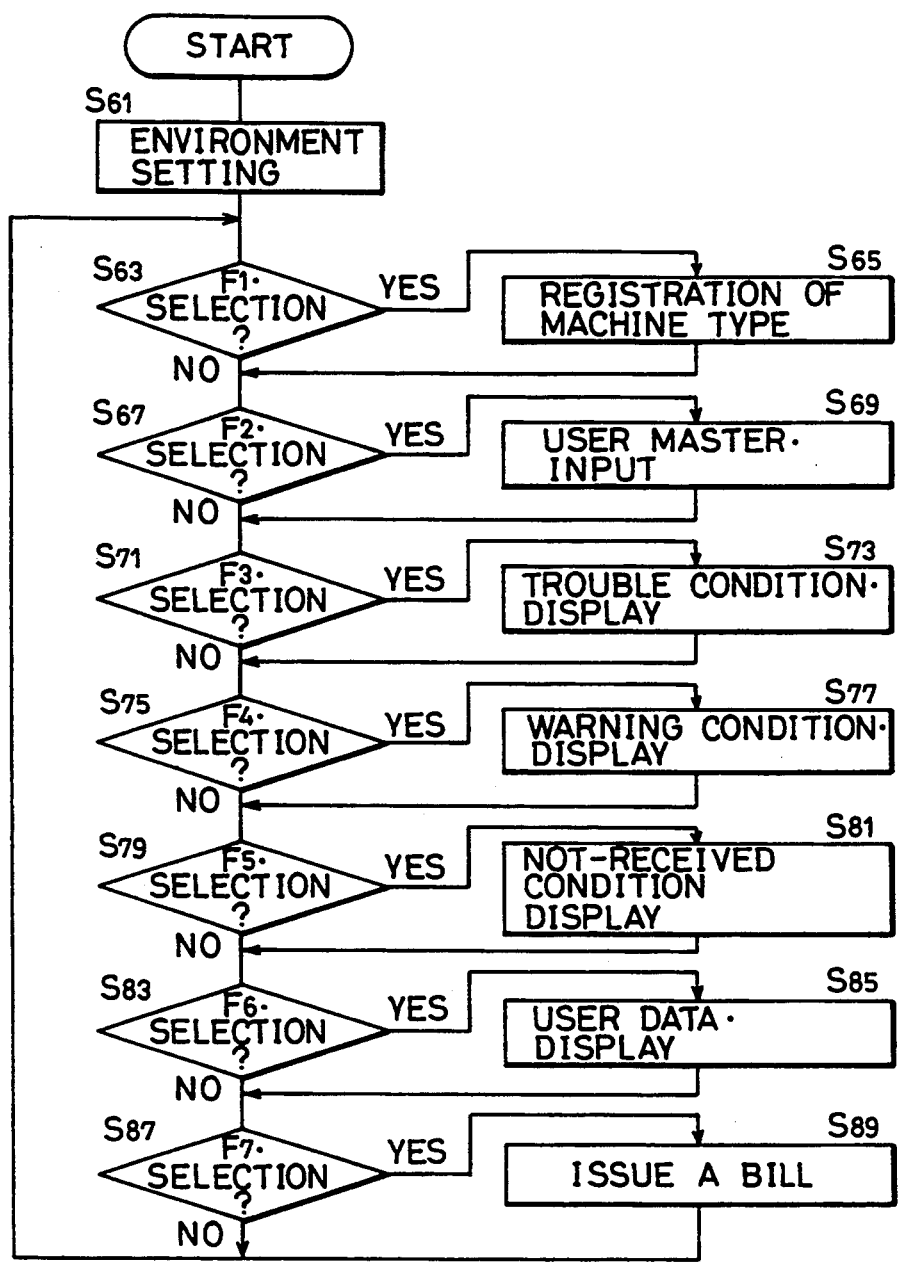
FIG. 17 is a flow chart showing a main routine of a controlling CPU of the centralized control unit of FIG. 1.

(a) F1–F7 key processes (FIG. 17)

CPU 91 starts processing upon turn-on of a power source, and performs environment setting of a modem, a printer and the like (S61). Subsequently, in response to input operation of each key F1–F7, the following modes are set or the following processes are executed.

. F1 key operation (YES in S63)

An acceptance mode of machine type registration is set (S65). That is, new registration of machine type name, the number of items of element data, a name of each element data, a standard threshold value of each element data, a standard threshold value of each counter, etc. are accepted.

. F2 key operation (YES in S67)

A registration acceptance mode of a user master is set (S69). That is, new registration of a name of user, address, telephone number, machine type name, machine number, date and time of fixed time transmission, etc. are accepted. Also, the DTID is automatically set.

. F3 key operation (YES in S71)

The trouble conditions are displayed (S73). That is, user information (a name of the user, address, telephone number, a machine type name) of a copying machine of trouble transmission, date and hour of occurrence and so forth are displayed in display 92 together with contents of the trouble. The number of trouble cases is always displayed in a corner portion of display 92 without any connection with operation of F3 key.

. F4 key operation (YES in S75)

A warning condition is displayed (S77). That is, user information and so forth of a copying machine of the warning transmission are displayed in display 92 together with the contents of the warning. The number of warning cases is always displayed in a corner portion of display 92 without any connection with operation of the F4 key.

. F5 key operation (YES in S79)

A not-received condition is displayed (S81). That is, user information of a copying machine which does not make fixed time transmission even after a predetermined fixed time transmission time is displayed in display 92. The number of no receipt cases is always displayed in a corner portion of display 92 without any connection with operation of the F4 key.

. F6 Key Operation (YES in S83)

It comes in a display mode of user data (S85). That is, when a user is selected, user information is displayed in display portion 92. When a submenu is selected, counted values of various counters (a total counter, a counter for each paper size, a JAM counter, a trouble counter, a PM counter) of the copying machine of the particular user and element data are displayed for each month or for each item.

. F7 Key Operation (YES in S87)

A bill is printed out (S89). An amount of charge asked is calculated on the basis of the counted value of the total counter and a predetermined calculation expression, for example, and printer 94 is activated to print it out.

Figure 18:
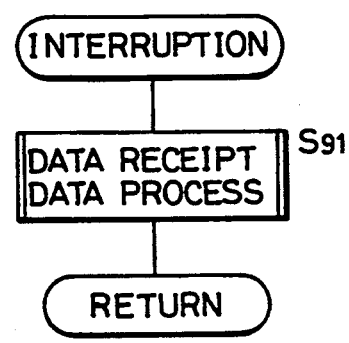
FIG. 18 is a flow chart showing an interruption process for the controlling CPU of the centralized control unit of FIG. 1.
Figure 19:
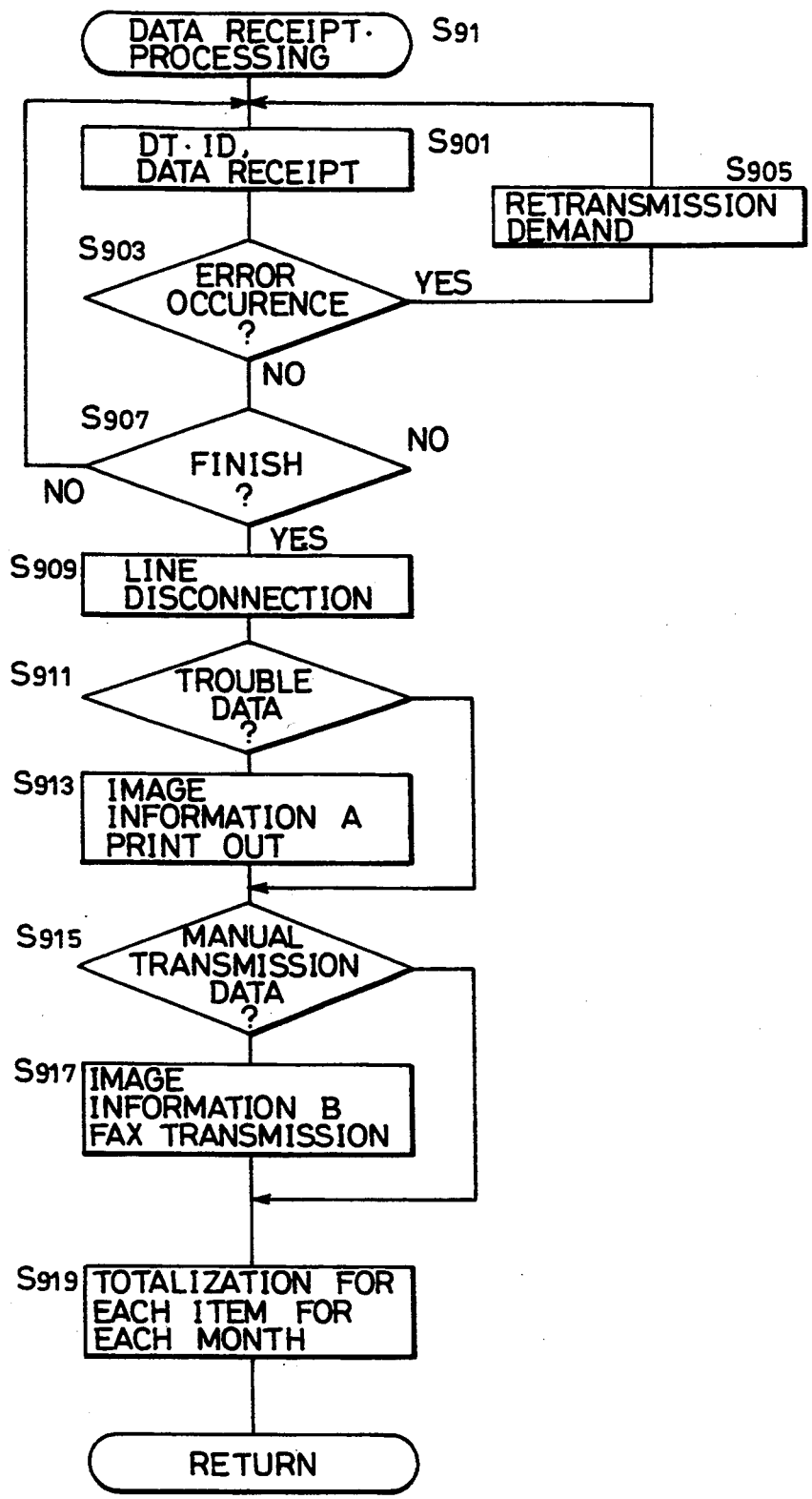
FIG. 19 is a flow chart showing specific contents of the data receipt and data process routine of FIG. 18.

(b) Interruption Process (FIGS. 18 and 19)

CPU91 receives the data transmitted from a DT by an interruption process, and applies a predetermined process to the received data (S91).

First, when an interruption is produced from the DT side, CPU91 receives the DTID and the transmission data (S901).

When a communication error occurs (YES in S903), CPU91 demands retransmission of the DTID and the transmission data for the DT side (S905).

When the communication is normally finished (YES in S907), CPU disconnects the line (S909).

Then, when the data transmitted from the DT is trouble data (YES in S911), image information A as shown in FIG. 20 is outputted to printer 94 corresponding to a type of the trouble (S913). The image information A includes trouble occurrence date and hour, a type of the trouble, relevant data, and a recovery measure, and the image information of the recovery measure is read from RAM97 by CPU91 corresponding to the type of the trouble.

On the other hand, when the data transmitted from the DT is manual transmission data (YES in S915), image information B as shown in FIG. 21 is facsimile-transmitted to a facsimile device corresponding to the DT through facsimile board 96 (S917). The image information B includes manual transmission date and hour, the received element data, and a recovery measure. As shown in FIG. 22, for the facsimile transmission, CPU91 stores telephone numbers of facsimile devices corresponding to respective DTIDs, and transmits the image information B to a corresponding facsimile device in response to a DTID received from a DT. A determination as to whether or not the data transmitted from the DT is manual transmission data can be made by examining a specific code provided at a head portion of transmitted data from a DT.

Then, CPU91 finds a total of data for each item and for each month to produce data to be screen-displayed by an operator's selection (S919).

Next, another embodiment of the present invention will be described.

In the above-described embodiment, image information is transmitted from the center to a facsimile device corresponding to a DT which made manual transmission, but in this embodiment, when a copying machine connected to the DT has a digital image forming function capable of forming an image on the basis of an electric signal, image information is transmitted to the copying machine from the center through the DT which made manual transmission.

The different points from the previous embodiment only will be described below.

First, copying machine 4 is such a digital copying machine as described in U.S. Pat. No. 4,807,046, which can form an image on the basis of an electrical signal. As the image forming system of the copying machine 4, however, in addition to one employing a laser described in U.S. Pat. No. 4,807,046, optical recording methods employing an LED array, a liquid crystal array, PLZT array and the like may be introduced, and also the thermal recording system or the ink jet recording system may be introduced.

Figure 23:
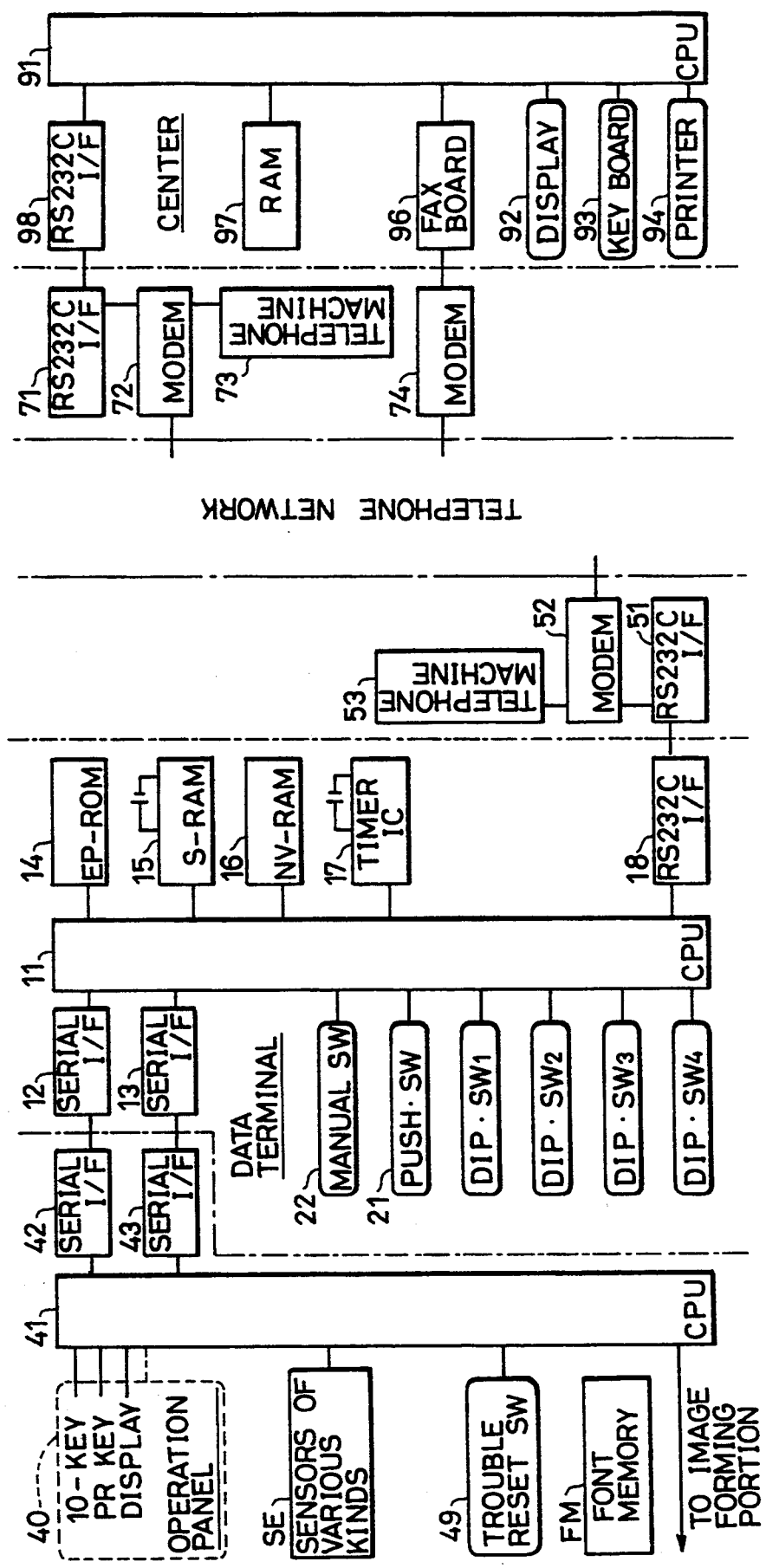
FIG. 23 is a diagram showing a configuration of a copying machine control system in the second embodiment of the present invention.

As shown in FIG. 23, a font memory FM storing bit images of predetermined characters and graphic forms corresponding to code data is connected to a CPU41 of copying machine 4. CPU41 develops an image to be formed into a bit map referring to the font memory FM on the basis of the received code data. An image forming portion of copying machine 4 forms an image based on the image data of the bit map.

Accordingly, CPU91 at the center, if data transmitted from a DT is manual transmission data, when the DT is connected to a copying machine having a digital image forming function, transmits code data corresponding to the image information B (FIG. 21) to the DT through a network. The DT then transmits the code data to CPU41 of the copying machine through serial I/Fs13 and 43. CPU41 of the copying machine makes the image forming portion form an image on the basis of the received code data.

For the code data transmission, CPU91 stores telephone numbers and copying machine models of DTs corresponding to respective DTIDs. Storing copying machine models corresponding to respective DTs enables making determination as to whether the DT is connected to a copying machine having a digital image forming function or not. On the other hand, when data transmitted from a DT is manual transmission data, if the DT is connected to a copying machine having no digital image forming function, image information is transmitted to a facsimile device as described above.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A copying machine control system including a control terminal for collecting data about a copying machine, a centralized control unit for receiving the data collected by said control terminal, wherein said control terminal comprises:

first receiving means for receiving the data from said copying machine, and first transmitting means for requesting communication with said centralized control unit and transmitting the data received by said first receiving means to said centralized control unit when communication has been established, and said centralized control unit comprises;

second receiving means for receiving data from the first transmitting means of said control terminal, determining means for determining if the data received by said second receiving means includes predetermined data which indicates that the communication was established in response to a manually input command to transmit and generating an output indicating said determination, and second transmitting means for preparing image information according to the data received by said second receiving means and transmitting the prepared image information to a location based on said output of said determining means.

2. The copying machine control system according to claim 1, wherein the data received by said first receiving means includes data related to a copying process.

3. The copying machine control system according to claim 1, wherein said control terminal further comprises input means for inputting a command for transmitting the data received by said first receiving means to said centralized control unit, and said first transmitting means is activated in response to said inputted command.

4. A copying machine control system according to claim 1, wherein said control terminals request communication with the centralized control unit based on a comparison of said collected data with a predetermined threshold.

5. A copying machine control system according to claim 1, wherein said centralized control unit further comprises means for setting fixed times at which the control terminals will transmit data to the centralized control unit.

6. A centralized control unit receiving data from a plurality of control terminals collecting data related to each of a plurality of copying machines, comprising:

receiving means for receiving data from said control terminals;

determination means for determining that said received data includes predetermined data which indicates that the communication was established in response to a manually input command to transmit and generating an output indicative of said determination; and transmitting means for preparing image information according to the data received by said receiving means and, in response to an output of said determination means, transmitting the prepared image information to a a location based on said output, said transmitting means including storing means for storing facsimile transmission destinations corresponding to the control terminals, respectively.

7. The centralized control unit according to claim 6, wherein the data received by said receiving means comprises data related to a copying process.

8. A copying machine control system according to claim 6, wherein said control terminals request communication with the centralized control unit based on a comparison of said collected data with a predetermined threshold.

9. A copying machine control system according to claim 6, wherein said centralized control unit further comprises means for setting fixed times at which the control terminals will transmit data to the centralized control unit.

10. A copying machine control system including a control terminal for collecting data about a copying machine and a centralized control unit receiving data collected by the control terminal, wherein said control terminal comprises;

first receiving means for receiving data from said copying machine, first transmitting means for requesting communication with said centralized control unit and transmitting the data received by said first receiving means to said centralized control unit after said communication has been established, and means for making said copying machine form an image corresponding to image information from said centralized control unit, and said centralized control unit comprises;

second receiving means for receiving the data from said first transmitting means of said control terminal, determining means for determining that the data received by said second receiving means includes predetermined data which indicates that said communication was established in response to a manually input command to transmit and generating an output indicative of said determination, and second transmitting means for preparing image information according to the data received by said second receiving means and transmitting the prepared image information to a location based on said output of said determining means.

11. The copying machine control system according to claim 10, wherein the data received by said first receiving means comprises data related to a copying process.

12. The copying machine control system according to claim 10, wherein said control terminal further comprises input means for inputting a command for transmitting the data received by said first receiving means to said centralized control unit, and said first transmitting means is operated in response to said inputted command.

13. A copying machine control system including a plurality of control terminals collecting data related to each of a plurality of copying machines and a centralized control unit receiving the data collected by said control terminals, said copy machine control system comprising:

a plurality of image forming means located at each control terminal side for forming an image on a paper based on image information, wherein said centralized control unit comprises receiving means for receiving data from said control terminals, determination means for determining that said received data is predetermined data which indicates that said communication was established in response to a manually input command to transmit and generating an output indicative of said determination, and transmitting means for preparing image information according to the data received by said receiving means and, in response to an output of said determination means, transmitting the prepared image information to a location based upon said output.

14. A copying machine control system according to claim 13, wherein said image forming means includes a facsimile device.

15. A copying machine control system according to claim 13, wherein said image forming means is provided on the copying machine.

16. A copying machine control system according to claim 13, wherein said control terminals request communication with and initiate the transmission of data to said centralized control unit.

17. A copying machine control system according to claim 13, wherein said centralized control unit further comprises means for setting fixed times at which the control terminals will transmit data to the centralized control unit.

18. A copying machine control system including a control terminal for collecting data about a copying machine, a centralized control unit for receiving the data collected by said control terminal, wherein said control terminal comprises:
 first receiving means for receiving the data from said copying machine,
 first transmitting means for requesting communication with said centralized control unit and transmitting at least some of the data received by said first receiving means to said centralized control unit when communication has been established,
 manually operable command means for commanding said first transmitting means to transmit, and
 command signal generating means for signalling said first transmitting means to transmit in response to internal parameters of said copying machine, and
wherein said centralized control unit comprises:
 second receiving means for receiving data from the first transmitting means of said control terminal,
 determining means for determining whether the data received by said second receiving means was transmitted in response to a command from said manually operable command means or a signal from said command signal generating means and generating an output indicative of said determination, and
 second transmitting means for preparing image information according to the data received by said second receiving means and transmitting the prepared image information a location based on said output of said determining means.

19. The copying machine control system of claim 18, wherein said second transmitting means transmits said prepared image information to said facsimile device if said transmission was established in response to a manual transmit command.

20. The copying machine control system of claim 19, wherein said second transmitting means transmits said prepared image information to a printer associated with said centralized control unit if said transmission was established in response to internal parameters of said copying machine.

* * * * *